US012346298B2

(12) United States Patent
Covaci et al.

(10) Patent No.: US 12,346,298 B2
(45) Date of Patent: Jul. 1, 2025

(54) COMPUTER-IMPLEMENTED SYSTEM AND METHOD FOR MANAGING A LARGE DISTRIBUTED MEMORY POOL IN A BLOCKCHAIN NETWORK

(71) Applicant: nChain Holdings Limited, St. John's (AG)

(72) Inventors: Alexandra Covaci, London (GB); Giuseppe Destefanis, London (GB); Simone Madeo, London (GB); Patrick Motylinski, London (GB); Stephane Vincent, Luxembourg (LU)

(73) Assignee: NCHAIN LICENSING AG, Zug (CH)

( * ) Notice: Subject to any disclaimer, the term of this patent is extended or adjusted under 35 U.S.C. 154(b) by 1159 days.

(21) Appl. No.: 16/633,836

(22) PCT Filed: Jul. 16, 2018

(86) PCT No.: PCT/IB2018/055238
§ 371 (c)(1),
(2) Date: Jan. 24, 2020

(87) PCT Pub. No.: WO2019/021107
PCT Pub. Date: Jan. 31, 2019

(65) Prior Publication Data
US 2023/0334036 A1 Oct. 19, 2023

(30) Foreign Application Priority Data
Jul. 24, 2017 (GB) ...................................... 1711879

(51) Int. Cl.
*G06F 16/00* (2019.01)
*G06F 16/176* (2019.01)
(Continued)

(52) U.S. Cl.
CPC ........ *G06F 16/2255* (2019.01); *G06F 16/176* (2019.01); *G06F 16/1815* (2019.01);
(Continued)

(58) Field of Classification Search
CPC ............... G06F 16/2255; G06F 16/176; G06F 16/1815; G06F 16/1865; G06F 16/188;
(Continued)

(56) References Cited

U.S. PATENT DOCUMENTS 7,590,236 B1 * 9/2009 Boneh ................... H04L 9/3073
713/168
10,097,356 B2 * 10/2018 Zinder .................. H04L 9/3247
(Continued)

FOREIGN PATENT DOCUMENTS

CN 106506638 A 3/2017
CN 106650494 A 5/2017
(Continued)

OTHER PUBLICATIONS

Tien TuanAnh Dinh et al., "Blockbench: A Framework for Analyzing Private Blockchains", Proceedings of the 2017 ACM international conference on management of data, Mar. 12, 2017, pp.*
(Continued)

*Primary Examiner* — Srirama Channavajjala
(74) *Attorney, Agent, or Firm* — Tarolli, Sundheim, Covell & Tummino LLP

(57) ABSTRACT

A computer-implemented method implemented in a blockchain network is described. Validation nodes receive data regarding a newly mined block comprising a plurality of transactions and send a delete request to a distributed memory pool to delete the plurality of transactions from the distributed memory pool. Nodes storing the distributed memory pool store a plurality of transactions, the plurality of transactions forming at least part of a distributed memory
(Continued)

pool of transactions waiting to be mined into a block of a blockchain. The computer-implemented method further comprises receiving a delete request from a validation node of the blockchain network, the delete request identifying one or more transactions which have been included in a newly mined block, the delete request indicating that the one or more transactions should be deleted from the distributed memory pool.

22 Claims, 11 Drawing Sheets

(51) Int. Cl.
| | |
|---|---|
| G06F 16/18 | (2019.01) |
| G06F 16/188 | (2019.01) |
| G06F 16/22 | (2019.01) |
| G06F 16/23 | (2019.01) |
| G06F 16/2455 | (2019.01) |
| G06F 16/28 | (2019.01) |
| G06Q 10/06 | (2023.01) |
| G06Q 20/00 | (2012.01) |
| G06Q 20/06 | (2012.01) |
| G06Q 20/38 | (2012.01) |
| H04L 9/32 | (2006.01) |

(52) U.S. Cl.
CPC ........ *G06F 16/1865* (2019.01); *G06F 16/188* (2019.01); *G06F 16/2365* (2019.01); *G06F 16/24565* (2019.01); *G06F 16/289* (2019.01); *G06Q 10/06* (2013.01); *G06Q 20/065* (2013.01); *G06Q 20/3829* (2013.01); *H04L 9/3234* (2013.01); *H04L 9/3236* (2013.01); *H04L 9/3247* (2013.01); *H04L 9/3273* (2013.01)

(58) Field of Classification Search
CPC ............. G06F 16/24565; G06F 16/289; G06F 16/2365; G06Q 40/04; G06Q 20/389; G06Q 20/407; G06Q 10/06; G06Q 20/3829; G06Q 20/065; H04L 9/0637; H04L 9/0643; H04L 9/3236; H04L 9/3247; H04L 9/3234; H04L 9/3273
See application file for complete search history.

(56) References Cited

U.S. PATENT DOCUMENTS

| | | | | |
|---|---|---|---|---|
| 10,521,780 | B1* | 12/2019 | Hopkins, III | G06Q 20/12 |
| 10,891,383 | B2* | 1/2021 | Daniel | G06Q 10/06 |
| 11,468,411 | B2* | 10/2022 | Destefanis | G06F 16/2365 |
| 2006/0167960 | A1 | 7/2006 | Lomet | |
| 2014/0173226 | A1 | 6/2014 | Gold | |
| 2015/0356555 | A1 | 12/2015 | Pennanen | |
| 2016/0007750 | A1 | 1/2016 | Goetz et al. | |
| 2016/0330034 | A1* | 11/2016 | Back | G06Q 20/065 |
| 2016/0342977 | A1 | 11/2016 | Lam | |
| 2016/0342989 | A1* | 11/2016 | Davis | H04L 9/50 |
| 2017/0017955 | A1 | 1/2017 | Stern et al. | |
| 2017/0041148 | A1* | 2/2017 | Pearce | H04L 63/126 |
| 2017/0236120 | A1* | 8/2017 | Herlihy | H04L 9/3236 705/67 |
| 2017/0344435 | A1* | 11/2017 | Davis | G06F 16/9014 |
| 2017/0357966 | A1* | 12/2017 | Chandrasekhar | G06Q 20/3829 |
| 2017/0366353 | A1* | 12/2017 | Struttmann | G06F 21/6218 |
| 2018/0101560 | A1* | 4/2018 | Christidis | H04L 9/3236 |
| 2018/0101848 | A1* | 4/2018 | Castagna | H04L 9/3236 |
| 2018/0130034 | A1* | 5/2018 | Taylor | H04L 9/3234 |
| 2018/0139278 | A1* | 5/2018 | Bathen | H04L 9/3247 |
| 2018/0176228 | A1* | 6/2018 | He | H04W 12/06 |

FOREIGN PATENT DOCUMENTS

| | | | |
|---|---|---|---|
| EP | 3468095 | A1 * | 4/2019 |
| GB | 2549075 | A | 10/2017 |
| JP | 2017050763 | A | 3/2017 |
| WO | WO2016186873 | A1 * | 11/2016 |
| WO | WO 2017112664 | A1 * | 6/2017 |
| WO | WO2018059939 | A1 * | 4/2018 |
| WO | WO2018073564 | A1 * | 4/2018 |

OTHER PUBLICATIONS

Alexandru Stanciu, "Blockchain Based Distributed Control System for Edge Computing", 2017 21st International Conference on Control Systems and Computer Science (CSCS) (2017, pp. 667-671).*
Xinping Min et al., "A Permissioned Blockchain Framework for Supporting Instant Transaction and Dynamic Block Size", 2016 IEEE Trustcom/Big DataSE/ISPA (2016, pp. 90-96).*
Nagata, et al., "A Study on a Method of Identity Verification in Blockchains", IPSJ SIG Technical Report, vol. 2017-DPS-170 No. 19, 2017, Information Processing Society of Japan, 12 pages.
Yoshiharu, Akabane, "Outside Block Chain Structure and Theory Core Technology of FinTech Studied with Sample" 1st Edition, Japan, Co. Ltd. RIC Telecom, Nov. 30, 2016, 5 pages.
Alqassem et al., "Towards Reference Architecture for Cryptocurrencies: Bitcoin Architectural Analysis", 2014 IEEE International Conference on Internet of Things and IEEE Green Computing and Communications, Taipei, Taiwan, 2014, 9 pages.
Bitfury Group, "Incentive Mechanisms for Securing the Bitcoin Blockchain" White Paper, Dec. 7, 2015, 23 pages.
Tsai, et al., "Design Issue in Permissioned Blockchains for Trusted Computing", 2017 IEEE Symposium on Service-Oriented System Engineering, Apr. 2017, 8 pages.
KPMG LLP, "Consensus—Immutable Agreement for the Internet of Value Understanding an Evolving Blockchain Technology Landscape of Consensus-driven Opportunity in Financial Services", Appendix 3—Detailed Interview/Questionnaire Responses, 2016, 151 pages.
Antonopoulos, "Mastering Bitcoin—Unlocking Digital Cryptocurrencies," O'Reilly Media, Inc., Dec. 20, 2014, 282 pages.
Ethereum Reddit, "Why are There No Blockchain Based Voting Systems Yet?" retrieved from https://www.reddit.com/r/ethereum/comments/59ccyi/why_are_there_no_blockchain_based_voting_systems/, Oct. 25, 2016, 23 pages.
Helios, "Helios Voting," retrieved from https://web.archive.org/web/20160810095052/https://vote.heliosvoting.org/faq, Aug. 10, 2016, 4 pages.
International Search Report and Written Opinion mailed Sep. 28, 2018, Patent Application No. PCT/IB2018/055589, 11 pages.
Maiavictor, "How to Create a Decentralized Secret Ballot Among a Small Group of People?" retrieved from https://crypto.stackexchange.com/questions/39261/how-to-create-a-decentralized-secret-ballot-among-a-small-group-of-people, Aug. 9, 2016, 1 page.
Meter, "Design of Distributed Voting Systems," Feb. 8, 2017, 125 pages.
Möser, "Anonymity of Bitcoin Transactions," retrieved from https://www.wi.uni-muenster.de/sites/wi/files/public/department/itsecurity/mbc13/mbc13-moeser-paper.pdf, Jul. 18, 2013, 10 pages.
Nakamoto, "Bitcoin: A Peer-to-Peer Electronic Cash System," Bitcoin, Oct. 31, 2008, https://bitcoin.org/bitcoin.pdf, 9 pages.
Openbazaar, "Protocol—OpenBazaar Docs," retrieved from https://web.archive.org/web/20170617003245/https://docs.openbazaar.org/03.-OpenBazaar-Protocol/, Jun. 17, 2017, 30 pages.
Satoshi et al., "Connection Limits," Bitcoin Forum, Aug. 9, 2010, https://bitcointalk.org/index.php?topic=741.0;prev_next=prev, 2 pages.
Schaub et al., "A Trustless Privacy-Preserving Reputation System," retrieved from https://eprint.iacr.org/2016/016.pdf, 2016, 25 pages.
Soska et al., "Beaver: A Decentralized Anonymous Marketplace with Secure Reputation," retrieved from https://eprint.iacr.org/2016/464.pdf, 2016, 15 pages.
Tarasov et al., "Internet Voting Using Zcash," International Association for Cryptologic Research, Jun. 15, 2017, 8 pages.
UK Commercial Search Report mailed Dec. 1, 2017, Patent Appli-

(56) References Cited

OTHER PUBLICATIONS cation No. GB1711879.5, 7 pages.
UK IPO Search Report mailed Jan. 16, 2018, Patent Application No. GB1711879.5, 6 pages.
Valenta et al., "Blindcoin: Blinded, Accountable Mixes for Bitcoin," Medical Image Computing and Computer-Assisted Intervention, Sep. 5, 2015, 16 pages.
Yang et al., "Survey of Confidentiality and Privacy Preserving Technologies for Blockchains," R3, retrieved from https://z.cash/static/R3_Confidentiality_and_Privacy_Report.pdf, Nov. 14, 2016, 32 pages.
Ziegeldorf et al., "CoinParty: Secure Multi-Party Mixing of Bitcoins," Proceedings of the 5th ACM Conference on Data and Application Security and Privacy, Mar. 2, 2015, 12 pages.
National Intellectual Property Administration, PRC, "Third Office Action" in Application No. 201880049013.4, Mar. 29, 2024, 8 pages.
Anonymous: "Mempool—How Do Transactions Leave the Memory Pool?—Bitcoin Stack Exchange", Apr. 8, 2017, 1 page.

\* cited by examiner

| Rate (Tx/s) | Tx size avg. (Bytes) | Tx/block | Block size (Mb) | Storage (Gb/month) | Storage (Tb/year) |
|---|---|---|---|---|---|
| 10 | 250 | 6000 | 1.50 | 6.6 | 0.1 |
| 10 | 500 | 6000 | 3.00 | 13.1 | 0.2 |
| 10 | 1000 | 6000 | 6.00 | 26.3 | 0.3 |
| 100 | 250 | 60000 | 15.00 | 65.7 | 0.8 |
| 100 | 500 | 60000 | 30.00 | 131.4 | 1.6 |
| 100 | 1000 | 60000 | 60.00 | 262.8 | 3.2 |
| 1000 | 250 | 600000 | 150.00 | 657.0 | 7.9 |
| 1000 | 500 | 600000 | 300.00 | 1314.0 | 15.8 |
| 1000 | 1000 | 600000 | 600.00 | 2628.0 | 31.5 |
| 10000 | 250 | 6000000 | 1500.00 | 6570.0 | 78.8 |
| 10000 | 500 | 6000000 | 3000.00 | 13140.0 | 157.7 |
| 10000 | 1000 | 6000000 | 6000.00 | 26280.0 | 315.4 |
| 100000 | 250 | 60000000 | 15000.00 | 65700.0 | 788.4 |
| 100000 | 500 | 60000000 | 30000.00 | 131400.0 | 1576.8 |
| 100000 | 1000 | 60000000 | 60000.00 | 262800.0 | 3153.6 |

*Table 1: Relationship between the transaction rate, average transaction size, block size and the amount of monthly and annual storage space needed.*

Figure 14

Table 2 shows a comparison between current full nodes and future full nodes:

| Feature | Current full node | New full node |
|---|---|---|
| Mempool | Yes | Yes |
| Mempool size | ~10-100 Mb | ~0.1-1 Tb |
| Mempool type | RAM with fee-based lower cap | DHT with "unlimited" storage |
| Disk space/yr | ~100 Gb | ~1 Pb |
| Transaction validation | yes | yes |
| Block validation | yes | yes |

Figure 15

Table 3: Configurable parameters.

| Parameter | Description |
|---|---|
| $N$ | Set of validators responsible for the validation of a single transaction. |
| $N^{MAX}$ | Full set of validators for a data cluster. |
| $N^*$ | Minimum number of validators required to trigger the *reversible* pruning of a transaction. |
| $N^{**}$ | Minimum number of validators required to trigger the *physical* pruning of a transaction. |
| $M$ | Full set of mempool nodes in a data cluster. |
| $\Delta T^*$ | Time window to trigger the *physical* pruning of a transaction. |

Figure 16

COMPUTER-IMPLEMENTED SYSTEM AND METHOD FOR MANAGING A LARGE DISTRIBUTED MEMORY POOL IN A BLOCKCHAIN NETWORK

FIELD OF INVENTION

This specification relates generally to computer-implemented methods and systems suitable for implementation in nodes of a blockchain network. Modified blockchain node structures, network architectures, and protocols for handling large numbers of transactions and large transaction blocks are described. The invention is particularly suited, but not limited, to use with the Bitcoin blockchain.

BACKGROUND OF INVENTION

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing its locking and unlocking scripts. If execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the blockchain to implement new systems. It would be highly advantageous if the blockchain could be used for automated tasks and processes which are not purely limited to payments denominated in cryptocurrency. Such solutions would be able to harness the benefits of the blockchain (e.g. a permanent, tamper proof record of events, distributed processing etc.) while being more versatile in their applications.

One area of research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

SUMMARY OF INVENTION

The future of blockchain technology, e.g. Bitcoin, relies at least in part on proposals for new architectures able to increase the volume of issued transactions per second. One requirement for such new architectures is the removal of the current limitations on the block size limit. In this scenario, one technical problem is how to manage large blocks of data and how to manage the storage of a very large blockchain. Another technical problem is how to manage the pool of transactions which are waiting to be mined into blocks and incorporated into the blockchain. Local memory pools are not be able to provide sufficient storage capabilities, therefore new models for distributed memory pools (DMPs) need to be designed. Once transactions have been included on the blockchain it is desirable to remove the transactions from such a distributed memory pool. However, another technical problem is how to manage the removal of transactions from a distributed memory pool in a safe manner without causing problematic data inconsistencies within the distributed memory pool. Yet another technical problem is how to alleviate problems of data inconsistencies while also improving security to attacks which seek to disrupt the data stored in the distributed memory pool.

It is an aim of certain embodiments of the present invention to address these technical problems by providing technical solutions as described herein. In particular, this specification describes protocols for communication and data management between validation nodes and distributed memory pool nodes in a blockchain network allowing a distributed memory pool to be pruned while alleviating problems of data inconsistencies within the distributed memory pool. As such, the present invention provides a technical contribution by increasing the capacity of the blockchain network while maintaining its distributed nature.

A computer-implemented method for a node of a blockchain network is described, the computer-implemented method comprising:

storing a plurality of transactions, the plurality of transactions forming at least part of a distributed memory pool of transactions waiting to be mined into a block of a blockchain; and receiving a delete request from a validation node of the blockchain network, the delete request identifying one or more transactions which have been included in a newly mined block, the delete request indicating that the one or more transactions should be deleted from the distributed memory pool.

The aforementioned method allows a validation node to communicate with a distributed memory pool to remove transactions which have been incorporated into the blockchain and thus can be removed from the distributed memory pool. The sending/receiving of an explicit delete request indicating that the one or more transactions should be deleted from the distributed memory pool is distinct from a mere notification that a transaction has been mined. In prior art configurations, transactions which have been mined are not removed from the memory pool until sufficient blocks have been mined on top such that the transaction is confirmed. As such, the memory pool contains a large number of transactions, which are not likely to be required, for a significant amount of time after they have been mined into the blockchain. Furthermore, if miners automatically delete transactions after a certain period of time without being subject to a specific delete request protocol then this can lead to data inconsistencies in certain circumstances. The present invention recognizes and addresses these issues.

The method can further include marking a transaction as removed from the distributed memory pool when a first threshold number of delete requests is received for the transaction. The method can also include physically removing a transaction from the distributed memory pool when a second threshold number of delete requests is received for the transaction. The second threshold is larger than the first threshold. Furthermore, the first and second threshold numbers of delete requests are required to come from a threshold number of different validation nodes in the blockchain network. These features require a level of consensus for a transaction to be marked as removed in the distributed memory pool and a further level of consensus before a transaction is physically removed from the distributed memory pool. This alleviates problems of data inconsistencies and also improves security to attacks which seek to disrupt the data stored in the distributed memory pool. A transaction effectively comprises three states with respect to the distributed memory pool: available; removed; and physically removed. Transactions marked as removed can be reverted to being available again within the distributed memory pool if required. Those transactions which are physically removed may not be revertible depending on the configuration of the system.

A transaction may be physically removed from the distributed memory pool only after a threshold time has passed since receiving a delete request, during which time no further data requests for the transaction are received. For example, the threshold time may correspond to at least 1, 2, 3, 4, 5, 6 or more blocks being incorporated into the blockchain after the transaction was incorporated into the blockchain for which deletion from the distributed memory pool is requested. Furthermore, transactions may be physically removed from the distributed memory pool in descending order of time passed since receiving a delete request during which time no further data requests for the transaction are received. The computer-implemented method may also comprise marking a transaction as removed from the distributed memory pool when the transaction depends on a previously removed transaction. These features further aid in alleviating problems of data inconsistencies and also improve security to attacks which seek to disrupt the data stored in a distributed memory pool.

The delete requests can be stored in a new delete request database associated with the distributed memory pool. Delete requests received from validators which didn't validate the transaction may be discarded. The transactions may only be discarded if a check validator option is enabled. The number of data requests for transactions already marked as removed from the distributed memory pool can also be monitored. Using such a system, a transaction may be marked as a candidate for reversion back into the distributed memory pool after a threshold number of data requests is received for a transaction which is marked for removal from the distributed memory pool. A transaction may be unmarked as removed from the distributed memory pool when a revert request is received for the transaction or when a threshold number of revert requests is received for the transaction. The threshold number of revert requests can be required to come from a threshold number of different validation nodes in the blockchain network. A message indicating that a transaction has been removed from the distributed memory pool in response to a query for a transaction which has been removed from the distributed memory pool. Furthermore, such a message can indicate that a transaction has been removed from the distributed memory pool and also indicate the number of delete messages received for the removed message. Again, these features further aid in alleviating problems of data inconsistencies and also improve security to attacks which seek to disrupt the data stored in a distributed memory pool.

The aforementioned features of the protocol for distributed memory pool management are described from the perspective of distributed memory pool storage nodes in the blockchain network. From the perspective of validation nodes in the blockchain network, a computer-implemented method is provided which comprises:

receiving data regarding a newly mined block comprising a plurality of transactions; and sending a delete request to a distributed memory pool to delete the plurality of transactions from the distributed memory pool.

The delete request should preferably contain a nonce and/or a timestamp to avoid the dissemination of fraudulent duplicates which may affect the consensus protocol. The delete request is also preferably signed with a private key of the validation node.

The node can store a record of transactions which it has validated and only send delete requests for transactions which it has previously validated. The delete requests may only be sent for transactions which the node has previously validated when a check validator option is enabled. Furthermore, a revert request to make a transaction available again in the distributed memory pool can be sent, for example, after a blockchain reorganization to retain data consistency within the system.

Delete requests can be activated by one or more of:

reception of a mined block;

blockchain reorganization; and double spending or other form of transaction conflict.

Pruning of transactions from the distributed memory pool can be activated by one or more of:
- manual pruning:
- transaction expiration; and
- a memory limit being reached for transaction in the distributed memory pool.

Embodiments of the present invention can be provided in a variety of forms. For example, a computer readable storage medium can be provided which comprising computer-executable instructions which, when executed, configure one or more processors to perform the method as described herein. An electronic device can also be provided which comprises: an interface device; one or more processor(s) coupled to the interface device; and a memory coupled to the one or more processor(s), the memory having stored thereon computer executable instructions which, when executed, configure the one or more processor(s) to perform the method as described herein. Further still, a node of a blockchain network can be provided, the node configured to perform the method as described herein.

BRIEF DESCRIPTION OF THE DRAWINGS

These and other aspects of the present invention will be apparent from and elucidated with reference to, the embodiments described herein. Embodiments of the present invention will now be described, by way of example only, and with reference to the accompany drawings, in which:

FIG. 14 shows the relationship between the transaction rate, average transaction size, block size and the amount of monthly and annual storage space needed.

FIG. 15 shows a comparison between current full nodes and future full nodes.

FIG. 16 shows configurable parameters.

DETAILED DESCRIPTION

Types of Blockchain Network Nodes

Figure 1:
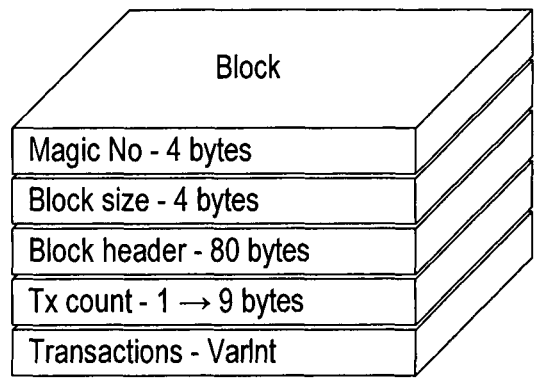
FIG. 1 shows the overall structure of a block.

A blockchain network may be described as a peer-to-peer open membership network which may be joined by anyone, without invitation or without consent from other members. Distributed electronic devices running an instance of the blockchain protocol under which the blockchain network operates may participate in the blockchain network. Such distributed electronic devices may be referred to as nodes. The blockchain protocol may be a Bitcoin protocol, or other cryptocurrency, for example.

The electronic devices that run the blockchain protocol and that form the nodes of the blockchain network may be of various types including, for example, computers such as desktop computers, laptop computers, tablet computers, servers, computer farms, mobile devices such a smartphones, wearable computers such as smart watches or other electronic devices.

Nodes of the blockchain network are coupled to one another using suitable communication technologies which may include wired and wireless communication technologies. In many cases, the blockchain network is implemented at least partly over the Internet, and some of the nodes may be located in geographically dispersed locations.

Currently, nodes maintain a global ledger of all transactions on the blockchain, grouped into blocks each of which contains a hash of the previous block in the chain. The global ledger is a distributed ledger and each node may store a complete copy or a partial copy of the global ledger. Transactions by a node affecting the global ledger are verified by other nodes so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output (UTXO). A subsequent transaction may then reference that address as an input in order to spend or disperse that value.

Nodes may be of different types or categories, depending on their functionality. It has been suggested that there are four basic functions associated with a node: wallet, mining, full blockchain maintenance, and network routing. There may be variations of these functions. Nodes may have more than one of the functions. For example, a "full node" offers all four functions. A lightweight node, such as may be implemented in a digital wallet, for example, and may feature only wallet and network routing functions. Rather than storing the full blockchain, the digital wallet may keep track of block headers, which serve as indexes when querying blocks. Nodes communicate with each other using a connection-oriented protocol, such as TCP/IP (Transmission Control Protocol).

An additional type or category of node may be provided: a merchant node (herein referred to at times as an "M-node"). M-nodes are designed to focus on fast propagation of transactions. They may or may not store a full blockchain and do not perform mining functions. In that sense, they are similar to lightweight nodes or wallets; however, they include additional functionality to enable fast propagation of transactions. The operational focus of the M-nodes is the quick validation and propagation of unconfirmed transactions, particularly to other M-nodes, from which the unconfirmed transactions are quickly pushed out to other nodes in the blockchain network. To facilitate this functionality, M-nodes are permitted a greater number of incoming and, particularly, outgoing connections that might otherwise be permitted for nodes under the governing protocol.

The M-nodes may be collectively referred to as the merchant network (or "M-net"). The term "merchant" may be interpreted as meaning "specialised". The M-nodes may be integrated into the blockchain network. Each M-node is a specialized node on the blockchain network that meets certain hardware and performance capabilities that will ensure that it is able to carry out the functions of an M-node. That is, the M-net might be considered a sub-network within and distributed through the blockchain network. The M-Node(s) may be arranged and configured to perform one or more dedicated functions or services.

In order for the M-net to run reliably and be able to offer services at a certain security level, the M-nodes need to maintain a good overview of the whole M-net and thus an efficient routing protocol needs to be in place. Every time an M-node receives an initiating transaction it needs to broadcast it to several other M-nodes, as well as other nodes. In the context of the M-net, this amounts to finding a solution to the multiple traveling salesman problem (MTSP). There are a plethora of solutions that address this issue, any one of which may be employed in the M-net. The M-nodes each run routing optimization in some, up-to-date form.

In some implementations, the M-net is implemented as a decentralized IP multicast type of network. That is, to enable fast proliferation of an incoming transaction to the blockchain network, multicast may be used to ensure that the transaction is broadcast quickly throughout the M-net, allowing all the M-nodes to then focus on forwarding the transaction to other nodes in the blockchain network.

A multicast network architecture allows the possibility of simultaneous distribution of data towards a group of destination nodes, without data duplication for each of the nodes interested in receiving the information. If a node wants to receive a multicast transmission, it joins the multicast group (registration phase) and after that it will be able to receive all the data sent over the multicast group. IP multicast can scale to a larger receiver population by not requiring prior knowledge of how many receivers there are and the network infrastructure is used efficiently by requiring the source to send a packet only once. For the nature of a multicast network, the use of connection oriented protocols (like TCP) is impractical due to simultaneous communication with a large number other nodes. Accordingly, a connectionless protocol is used.

Some blockchain networks, such as Bitcoin, use TCP for node-to-node communications. Data packets sent using TCP have an associated sequence number which is used for ordering purposes. In addition to this, the TCP protocol involves a three-way handshake procedure, both when establishing a connection as well as terminating one. Packets sent over TCP come with an overhead associated, they have a sequence number associated and there is a three-way handshake protocol. In establishing a connection 128-136 bytes are being transmitted, whereas closing a connection costs 160 bytes. Thus the handshake in packet transmission costs up to 296 bytes. Additionally, when a node receives a new transaction, it notifies the other nodes with an inventory (INV) message which contains the hash of the transaction. A node which receives an INV message checks whether the hash of that transaction has been seen before; if not, the node will request the transaction by sending a GETDATA message. The time necessary to transmit a transaction from Node A to Node B is T1=verification+TCP(inv+getdata+tx), where TCP( ) indicates the overhead, in terms of time, introduced by the TCP handshake procedure.

The M-nodes may be configured to use TCP for communications with other nodes where that is mandated by an existing protocol, like Bitcoin. However, they may use a connectionless protocol, like User Datagram Protocol (UDP), for communications from M-node to M-node, or even more suitably from M-node to multiple M-nodes in a multicast situation. Unlike TCP. UDP does not involve a handshake protocol so the M-node is able to propagate transactions more quickly. This can also avoid having a malicious node tie up other nodes by sending repeated INV messages without ever sending an actual transaction.

The lightweight nature of UDP is associated with certain trade-offs. There is less error checking and no error recovery. In some implementations, these limitations of UDP can be overcome at the application level through implementing error recovery, ordering and re-transmission as functionalities of the application layer. Placing error checking at the application level removes the overhead from the network.

In one example situation, a regular node on the blockchain network generates a transaction that it wishes to have processed via the M-net, such as a merchant-based payment. It may send the transaction to an M-node, which then broadcasts it to other M-nodes using multicast, or it may send the transaction directly to multiple M-node if it knows the IP multicast address for the M-nodes. In some examples, all M-nodes of the M-net are members of a single multicast address, so all transactions sent to that address are received by all M-nodes; however, in some cases, there may be more than one multicast address associated with the M-net, and a receiving M-node may assess, from routing information, whether further broadcast of the transaction to other multicast addresses is required to propagate the transaction to the full M-net.

Multicast assists in ensuring fast initial propagation of new transactions to all M-nodes; however, the multicast solution does not necessarily address a scalability problem with the blockchain network that comes from an increased transaction throughput. Each node in the network typically maintains a mempool containing the unconfirmed transactions it has seen and that have not yet been incorporated into the blockchain by a miner completing a proof-of-work. A significant growth in the number of transactions coming from use in payment processing would increase the volume of transactions to store in each mempool. Accordingly, although the nodes in the M-net are able to receive a new transaction almost at the same time, they may have storage capabilities limitations with respect to a large and quickly changing mempool.

To address this problem, the M-nodes may use a shared mempool implemented by way of a Distributed Hash Table (DHT) as an alternative to using multicast.

Assuming an average size of a transaction (TX) of 500 bytes and a transaction rate of ~$10^4$ TX/s, the M-net may receive ~400 GB of daily incoming data. All of this data needs to be stored for varying amounts of time in a mempool of unconfirmed transactions. Accordingly, the M-net requires significant storage and the capability to store data fast. In order not to put too many requirements on each individual M-node, the M-nodes implement a shared mempool which relies on a DHT. Instead of having each M-node keep all incoming TXs in its own mempool, each M-node only stores a certain fraction of the total, and hashes and associated key values of the rest.

DHTs are a class of decentralized distributed systems which allows the membership partitioning of a key set among nodes and which are able to send messages in an efficient and optimized manner only to the owner of a given key. Each node of a network can be seen as a cell of an array of a hash table. DHTs are designed for managing a high number of nodes, allowing the possibility for new nodes to join the network, old nodes to leave and crash without compromising the integrity of the shared data. DHTs ensure decentralization (there is no central authority, nor central coordination), scalability (the system has an efficient behaviour with millions of nodes), and fault tolerance (the system is reliable and able to manage nodes which join and leave the network or crash). Each node of the network may stay in touch with only a small number of other nodes, hence in the presence of a change or a new piece of data, the network is not overloaded.

The same concept may be applied for the UTXO database, a database which contains the set of all unspent outputs on the blockchain. An UTXO database may be built using a DHT in order to share the content among a set of nodes.

There are a number of possible DHT architectures and protocols that may be used to implement a shared mempool for the M-net. One example is Pastry™, although there are many others. Pastry™ is a protocol designed for maintaining an overlay network able to store and transfer information on a distributed system. Each node in the Pastry™ network is assigned a 128-bit identifier, which is used to indicate a node's position in a circular nodeID space (ranging from 0 to $2^{128}-1$). The ID is assigned randomly when a node joins the network. Each node maintains a routing table, a neighbourhood set and a leaf set.

One factor to consider in dimensioning a robust DHT is the number of replicas needed to ensure robustness and reliability of the whole network. As already mentioned, nodes can join and leave the network, and this fact should not affect the availability of data. If a node which stores a transaction A leaves the network, it is necessary to find the transaction A in another portion of the network. In existing blockchain networks, like Bitcoin for example, the network has a number or blockchain replicas equal to the number of full nodes in the network (an average of 5000 replicas), but this fact affects scalability.

In one M-net configuration, the mempool is not fully replicated at every M-node but, instead, is implemented by way of DHT. To provide for reliability, the DHT may be implemented so as to have some overlap: i.e. each transaction data item is replicated in more than one M-node, although not in every M-node. As an example, the DHT may be implemented so as to specify a minimal number of 2 replicas. This results in a probability of the 2 nodes going down at once in any given hour, assuming complete independence between nodes would be $$\left(\frac{1}{(24*365)}\right)^2 = 1.30*10^{-8}.$$

A process for storing a new transaction in a distributed mempool may thus comprise the following steps where the distributed mempool is implemented using a DHT. The process includes a node sending a transaction to an M-node. The M-node hashes the transaction or the transaction ID, depending on the implementation, to obtain a key value. The key value indicates the M-node or M-nodes (in the case of replicated data) at which the transaction is to be stored. The M-node then stores the transaction in the distributed mempool, which may include routing the transaction to the correct M-node(s) at which it is to be stored based on the key value and the assigned IDs of the M-nodes in the M-net. The M-node may receive an acknowledgement, depending on the DHT protocol involved. When an M-node receives a new transaction from a regular node, the M-node may perform certain validation operations to verify the authenticity of the transaction.

The transaction may be hashed to generate a key for the transaction. The key may indicate where in the DHT the transaction should be stored, which may be at a node other than the current M-node. The M-node then assesses whether the transaction is already in the DHT in operation. Each M-node has a portion of the stored transactions based on a division of the keyspace amongst the M-nodes that make up the M-net. In some configurations, the keyspace is divided among the participating M-nodes. The division may involve overlapping so as to cause replication for resiliency of the network. In some implementations, such as using Pastry™, each M-node is assigned a unique key or ID number and transactions may be stored at the M-node or M-nodes (in the case where replication is desired) based on proximity to the transaction's key value. The M-nodes may have a stored portion of the transactions locally and hashes or key values of the rest. Accordingly, the M-node may be able to evaluate whether the new transaction is in the DHT based on local data in operation.

If the transaction is not in the DHT, the M-node then, in operation, stores the transaction in the DHT based on its key value. In a general sense this may take the form of a put(k, tx) operation, where k is the key value and tx is the transaction. The applicable DHT routing protocol ensures that the transaction is sent to and stored at the appropriate M-node(s). The DHT may operate in accordance with various protocols for distributed hash tables depending on the implementation selected. The use of DHT for storing a transaction in the M-net avoids the use of INV/GETDATA messages within the M-net to route the transaction to every M-node.

In operation the M-node may, in this example, send the transaction to regular nodes in the blockchain network in accordance with the normal transaction forwarding protocols of the blockchain network. For example, the communication to ordinary nodes may employ TCP for node-to-node connections.

In one configuration, an M-node includes a processor, a network interface and memory. The M-node may be implemented using any suitable computing hardware having network connectivity and sufficient processing and memory resources to carry out the functions described herein. The M-node may include processor-executable instructions to implement the functions described herein. In some cases, the processor-executable instructions may be referred to as a blockchain merchant node application, although it will be appreciated that the instructions may be implemented in one or more modules, applications, scripts or other programming structures, depending on the hardware and operating system. The processor may include a multi-core processor, and/or multiple processors.

The memory stores data, including an assigned portion of the DHT-based mempool, based, in part, on its DHT key value, i.e. the M-node ID. In this example implementation, the memory further stores a routing table, neighbourhood set, and leaf set. The routing table contains a list of specific routing destinations within the M-net, and when a node receives a packet of data, it references the routing table to know where to send that data. The routing table may also contain information on how far each destination is from the M-node. The neighbourhood set contains information about close M-nodes based on, for example, proximity metrics (ping latency). The leaf set contains numerically close M-nodes. M-nodes are numerically close if their key values (node ID) are numerically close. The memory further includes an M-node reputation table, as will be further explained below.

To provide for scalability, in addition to implementing the mempool using a DHT, the M-net allows for nodes to join the M-net. A new node will need to have the address of at least one M-node already part of the M-net so that it can direct its join request to one of the M-nodes. The M-node may perform certain validation actions, which may involve querying the new node. For example, the M-net may have a set of minimum criteria associated with joining the M-net that it specifies to the M-nodes. As an illustration, the criteria may include minimum processing resources available, or minimum free memory available, or connectivity requirements.

Assuming the M-node completes whatever validation operations are performed to vet the new node, it then forward a joinrequest( ) to the DHT in accordance with whatever DHT protocol governs operation of the DHT. The DHT then communicates with the new node to provide it with a routing table, key value (node ID), and any other data to enable the new node to function as a new M-node on the M-net.

It will be appreciated that the ease with which a node is able to join the M-net creates a vulnerability in that a malicious node may join the network. In order to identify and isolate a potential malicious node, one configuration provides for the M-nodes to store an M-node reputation table to be used for tracking and updating node behaviour ranking. When a new node joins the network, the node may be added to the M-node reputation table, as indicated by a node ID field. The table may further include a join time in some implementations. The table further includes a score or rating for that M-node.

The score may be adjusted up or down based on certain behaviour metrics. For example, if the M-node fails to forward transactions, remains silent for a period of time, floods the M-net with traffic determined to be non-transactional, or otherwise engages in negative behaviour, its ranking may be dropped or decremented. If a node's score falls below a preset minimum, then it may be excluded from the M-net.

The M-node reputation table maintained at a particular M-node may be limited to tracking scores of its neighbours, rather than the full M-net. Accordingly, when a new M-node joins the network at the time t, the M-node reputation tables of its neighbours do not contain any information about the new node, but from the moment t they start building a reputation of the new node storing the information in the nodes register table. For example, if the new node is a silent node, meaning that it does not transfer the information it receives over the network, all the neighbours start recording this behaviour in their respective M-node reputation tables, for example assigning a negative value to the ID of new node. After a certain time t+n, if the M-node reputation tables of all the nodes which are aware of the new node, contain a negative value, the nodes may decide to isolate the new node and ban it from the network.

Transactions in the distributed mempool of the M-net may wait for a significant period of time before being confirmed. i.e. before being incorporated into a block that is added to the blockchain and confirmed. A block is considered "confirmed" when a sufficient number of subsequent blocks have been added to the blockchain above it such that it would be computationally impractical to reverse the growth in the chain and remove the block in order to change to a different branch or fork.

Because of the size and flexibility of the mempool and the volume of transactions, it is possible that a given transaction may be unconfirmed for longer than in some blockchain implementations, like Bitcoin. In a conventional Bitcoin implementation, a transaction is removed from the mempool as soon as it is incorporated into a block. This means that if the block ends up being an orphan block that all the transactions in the block are retransmitted on the network. This may be impractical or may result in long delays for confirming certain transactions in the case of a fast transaction network.

Accordingly, in some implementations, the mempool may track the number of confirmations of the block into which the transaction has been incorporated, i.e. the number of blocks added to the blockchain subsequent to the block in which the transaction is incorporated. Only after a predetermined number of confirmations have occurred is the transaction removed from the mempool. The predetermined number may be 4, 5, 6, 7 or any suitable number for a given implementation. A mempool data entry may be structured to include a transaction ID field, a transaction field, and a number of confirmations (NoC) field. In another implementation, rather than tracking the NoC, the mempool data entry may simply record the block number. From the block number it can assess, based on the current block number of the blockchain, how many confirmations have occurred.

Once the requisite number of confirmations has occurred, the transaction may be safely removed from the mempool. In this way there is no transactions-loss in case of orphan blocks, and a transaction will be permanently removed after the requisite number of confirmations.

The solution as described in the following portion of this specification utilizes a modified type of the fast validation nodes as previously described. A new full node configuration is described, which effectively is the M-nodes validation architecture enhanced with large scale storage capability and a modified operational protocol. Together the M-nodes and the storage nodes make up the core of the new full nodes. The new node structure is described in detail, including the technical requirements and technical solutions necessary, and a sustainable incentivisation model is provided.

Block Size and Storage Requirements

The current block size is 1 Mb. Currently a block consists of fields containing a so-called magic number (always the same value), the value indicating the actual size of the block, a so called block header, the number of transactions contained in the block and, finally, the list of actual transactions. The latter always starts with the coinbase transaction, which is the transaction containing the reward for mining the block. In FIG. 1 the overall structure of a block is shown.

The block header contains the following:
1. Version number (4 bytes)
2. Hash of previous block header (32 bytes)
3. Merkle root hash (32 bytes)
4. Time (4 bytes)
5. Target threshold (encoded as nBits—4 bytes)
6. Nonce (4 bytes)

Currently a block contains approximately 2000 transactions and a block is mined approximately every 10 minutes (the 10 minute block time was set as a compromise between first confirmation time and the time wasted on chain splits). This provides a transaction rate of approximately 3.5 transactions per second with a theoretical maximum of 7 transactions per second. In contrast VISA operates with a rate of approximately 10000 transactions per second and is capable of reaching 50000+ transactions per second.

It is clear that in order to create a competitive payment system, some sort of circumvention of the current constraints will be necessary. As the 10 minute block time is well established, it is imperative to consider changes to the block size and thus the blockchain itself. In this specification a scalable solution is described that would be able to handle, for example, approximately 50000 transactions per second.

Increments to the current block size or even complete removal of the limit is a much debated and, at times contentious topic. There seems to be strong arguments on both side, since both retaining the current size as well as increasing it has significant benefits and trade-offs.

Assuming a transaction rate, r, we can calculate the necessary block size. In the following an (average) 10 minute blocktime is assumed. Thus, let T(r) be the number of transactions per block. We have $$T(r) = r \cdot 6 \cdot 10^2 \text{block}^{-1}$$

If $s_{TX}$ is the average transaction size in bytes then the block size $B(r, s_{TX})$ can be expressed as $$B(r, s_{TX}) = s_{TX} \cdot T(r) = s_{TX} \cdot r \cdot 6 \cdot 10^2$$

Hence, considering the scenario where r=50000 Txs/s and $s_{TX}$=500 bytes, a quick back-of-the-envelope calculation yields:

$$T(50000) = 5 \cdot 10^4 \frac{Tx}{s} \cdot 6 \cdot 10^2 \frac{s}{\text{block}} = 3 \cdot 10^7 \frac{Tx}{\text{block}}$$

$$\Downarrow$$

$$B(50000, 500) = 3 \cdot 10^7 \frac{Tx}{\text{block}} \cdot 5 \cdot 10^2 \frac{\text{bytes}}{Tx} = 15 \text{ Gb/block}$$

This, in turn, leads to a storage requirement of O(10) Gb/year. It is quite apparent that with blocks of this size, we need slightly different approaches to both block propagation and storage. Table 1, as shown in FIG. 14, shows the relationship between the transaction rate, average transaction size, block size and the amount of monthly and annual storage space needed.

A New Bitcoin Network

Figure 2:
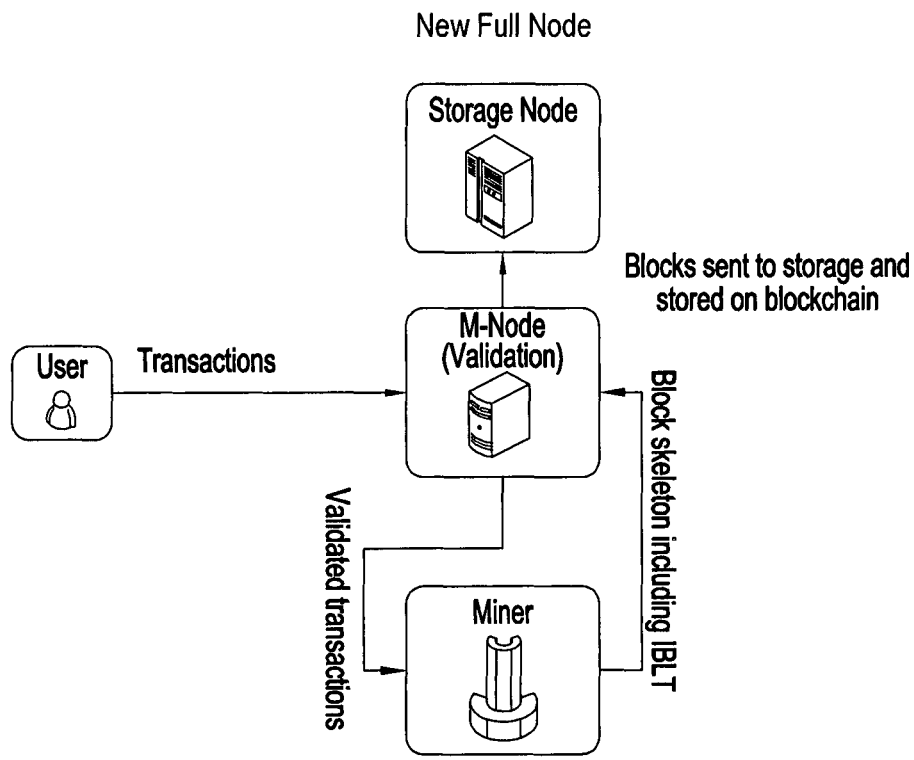
FIG. 2 shows a modified architecture for the Bitcoin network in terms of an operational diagram illustrating the steps from the moment a user submits a transaction until it ends up on the blockchain.

The architecture we propose for the Bitcoin network is illustrated in FIG. 2 which shows an operational diagram indicating the steps from the moment a user submits a transaction until it ends up on the blockchain.

A system is provided where special validation nodes (which maintain a shared mempool between themselves by means of a distributed hash table DHT) receive transactions, validate them, and allocate them in the mempool. The validation nodes then offer their service, which is to provide a list of valid transactions hashes, to the miners. The miners assemble pre-blocks (block skeletons), based on those hashes and attempt to solve the hash puzzles. When a solution to the puzzle has been found, the winning miner sends a block skeleton back to the validation nodes. These validate the block and ensure it is stored. Initially, it will be possible and feasible for the validation nodes to store the blocks themselves. When the block size eventually exceeds a certain threshold in size the validation nodes will either: a) extend their own storage capability; or b) outsource storing to specialized storage nodes. The two architectures are discussed later in this specification.

New Full Nodes

With blocks sizes of the order O(10) GB it no longer appears feasible to rely on PC-type nodes to provide storage capacity for hosting full images of the blockchain. Instead, facilities offering O(t) PH or more storage are required (see Table 1). The challenge, then, becomes to create a system that accommodates the new blocks while retaining the distributed, decentralized and no-trust nature of the network.

Two types of full node structures, and also a combination of these two types are envisaged:
1. Validation nodes with an associated petabyte storage rack
2. Validation nodes with an associated storage pools based on an internally decentralized, distributed peer-to-peer (P2P) single node network, much like the current Bitcoin network itself
3. A combination of 1 and 2.

The proposed solution attempts to solve the problem of keeping a distributed and decentralized record of the blockchain at all times by introducing nodes resembling the so-called full nodes operating on today's Bitcoin network but which, in contrast, have the ability to scale with the growing size of the blocks and number of transactions.

The difference is not limited to purely structural and hardware related issues. In contrast to home PC-based full nodes operating at the time of writing, the new nodes proposed here would be specialized nodes. They will require a fair amount of investment and thus, the incentivisation will be very different. In the scalable paradigm, both M-nodes (validation nodes) as well as new full nodes (combined validation and storage nodes) will be expecting compensation for their services.

At the other end of the spectrum, we have the decentralized and distributed storage solutions, largely made up of individual nodes. Good examples are Storj (Wilkinson et al., 2016), Sia (NebulousLabs) and MaidSafe (maidsafe). In the case of Storj, its functionality is based on participants getting rewarded for offering storage space.

As mentioned, it is also possible to imagine super nodes, which are comprised of both Petabyte (Pb) racks and peer-to-peer (P2P) storage systems.

Since the Bitcoin ecosystem relies heavily on the existence of multiple replicas of the whole blockchain distributed in a decentralized way, it becomes clear that it is important that all full nodes are compensated. This is very different from mining, which is essentially a game where the winner takes the whole prize. Because the miners will rely on their (winning) blocks to end up on the public blockchain it will be in their interest to reward the storing full nodes.

Nodes will group into pools that will act as super nodes. In order to maintain the distributed nature of the blockchain, there has to be a certain number of such super nodes (≥100). The super nodes are connected but non-overlapping.

Technical Requirements

As mentioned, there are two, overall differing architectures to be considered when discussing new full nodes (see Table 2).

New full nodes will need to maintain two types of storage:
1) Random Access Memory (RAM)-like Distributed Hash Table (DHT) memory/storage for the mempool.
2) Permanent tape-/disk-like storage for the blockchain.

As mentioned, for transaction rates r=50000 Tx/s the blocks are expected to be O(10) Gb which means an annual storage requirement of ~365×24×6×15 Gb=7.9·$10^5$ Gb=0.8 Pb/yr (see Table 1).

Table 2, as shown in FIG. 15, shows a comparison between current full nodes and future full nodes.

Figure 3:
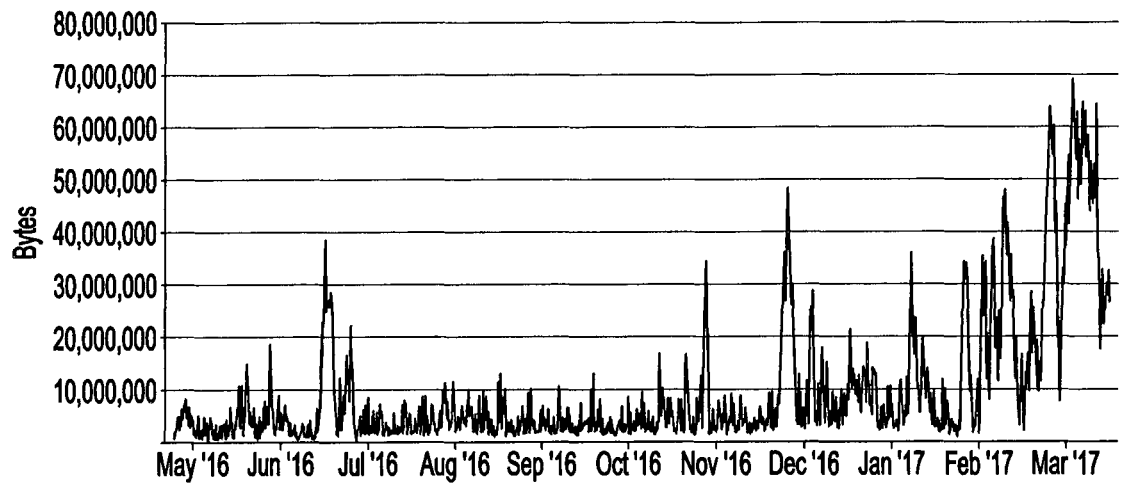
FIG. 3 shows a graph indicating an example of the aggregate size of transactions waiting in the mempool for confirmation.

At the same time the racks/clusters need to maintain a mempool. This will allow for quick block restoration. The necessary size of the mempool is more difficult to assess. Currently, with block sizes of approximately 1 Megabyte (~1 Mb) and approximately 4 transactions per second (~4 Tx/s), the aggregate size of transactions waiting in the mempool oscillate between 2 and approximately 70 Megabytes (~70 Mb). FIG. 3 shows a graph indicating the aggregate size of transactions waiting in the mempool for confirmation.

Figure 4:
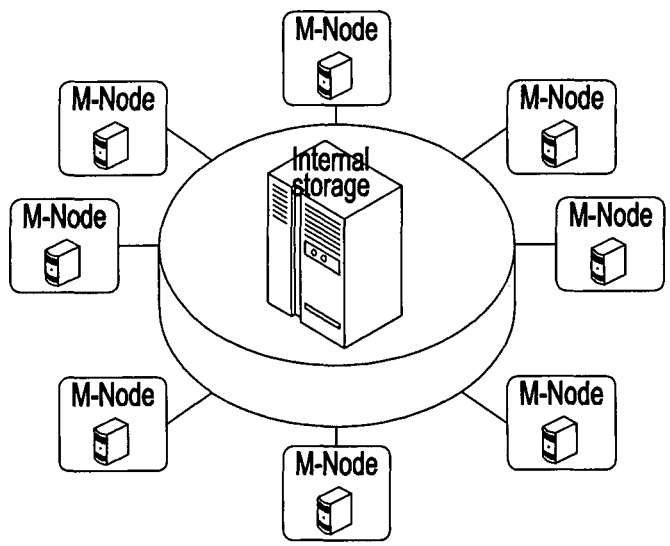
FIG. 4 shows a plurality of nodes linked to an internally centralized storage facility.
Figure 5:
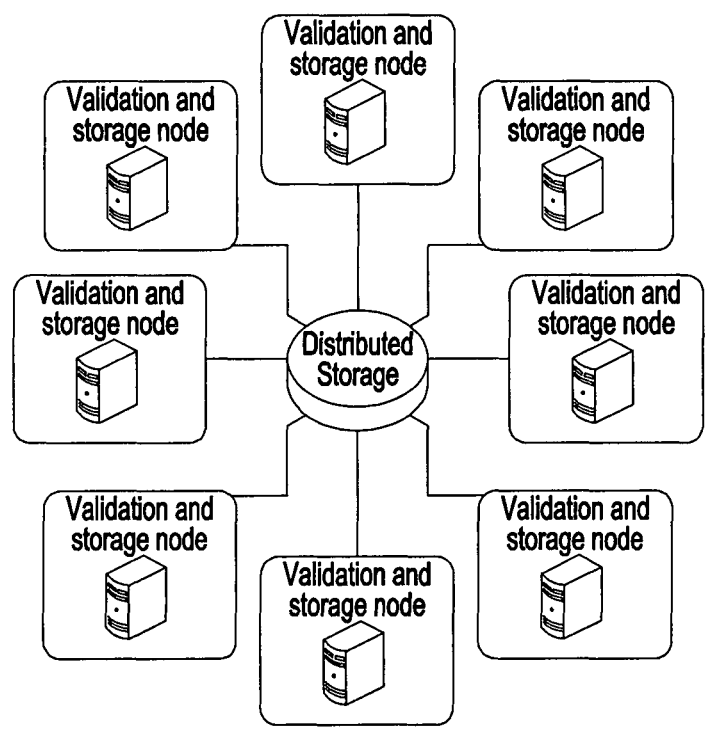
FIG. 5 illustrates a configuration in which each node is part of both a distributed mempool and a distributed storage facility.

As indicated, we envisage two fundamentally different structures, capable of storing large amounts of data, and combinations of those. The two structures are shown in FIGS. 4 and FIG. 5. FIG. 4 shows a configuration comprising a plurality of nodes with access to an internally centralized storage facility. FIG. 5 illustrates a configuration in which each node is part of both a distributed mempool and a distributed storage facility. The architecture depicted in FIG. 4 seems suitable for a larger entity that owns and maintains several validation nodes, which all have access to the entity's own storage facility. In contrast, the architecture depicted in FIG. 5 is fully decentralized. It is a solution suitable for individual nodes, such as home owned PC with sufficient storage capacity, that wish to join in shared, distributed storage pool. The underlying storage technology to be used for this, already exists (e.g. Storj, Sia, MaidSafe).

Figure 6:
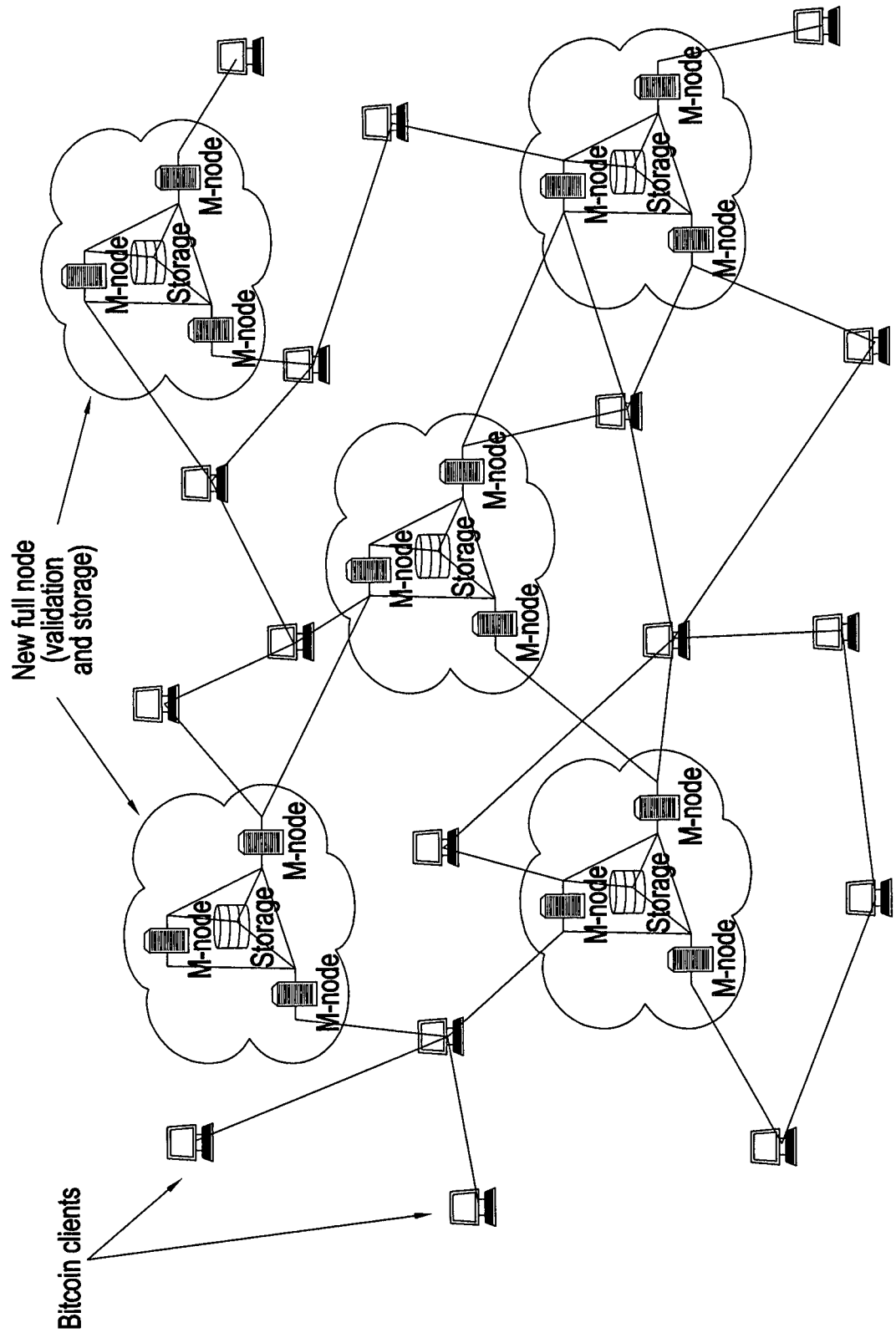
FIG. 6 illustrates how a new node structure fits into the Bitcoin network showing a network configuration in which validation nodes are members of storage pools and together the pools comprise a decentralised and distributed Bitcoin network.

One way of visualizing how the new full nodes fit into the Bitcoin network is shown in FIG. 6 which shows a network configuration in which validation nodes are members of storage pools. Together the pools comprise a decentralised and distributed Bitcoin network.

Full Node Operation

In the large block scenario we face a different situation, not solely due to space requirements. The mempool should be able to accommodate the equivalent of a block, i.e. approximately 15 Gigabytes (~15 Gb) and preferably the equivalent amount for the block to be mined next. This is to be combined with an overhead that needs to be accounted for, as well.
1) The mempools need to synchronize with the other validating nodes. This involves exchanging Invertible Bloom filter Lookup Tables (Michael T. Goodrich, 2011)
2) The IBLTs need to be scrutinized and missing transactions (Tx's) retrieved
3) Additionally retrieved Tx's need to be validated
4) Assembly of blocks, based on block skeletons received from miners or other full nodes A new full node keeps an up-to-date mempool. It does so by means of IBLTs exchanged with miners and other validation- and new full nodes.

The miners send a block skeleton (tuple) consisting of
1. A nonce, n
2. IBLT
3. Coinbase transaction Based on this, the new full node orders the transactions accordingly (in accordance with a specific set of rules) and assembles the newly mined block. New full nodes then proceed with storing the block on their own storage, as well as propagating the skeleton to other new full nodes. The protocol is described in more detail later in this specification.

Incentives

Figure 7:
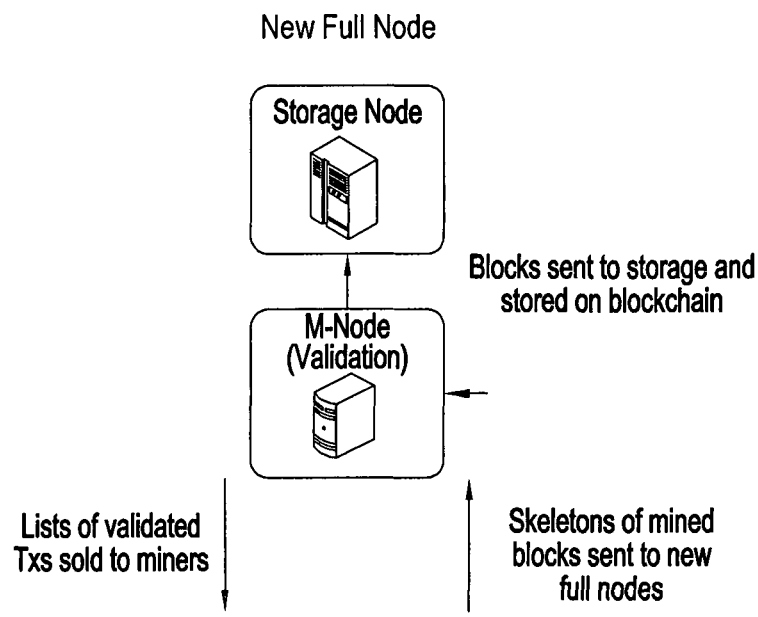
FIG. 7 illustrates functions of the new nodes.

One important feature of certain configurations is to build incentives into the system to incentive the provision of new node structures and services. Incentives are required due to the significant costs associated with storing the blockchain. FIG. 7 shows functions of the new full nodes. New full nodes will be rewarded for two types of services, predominantly:
1) Compiling lists of validated transactions, ready for mining. The hashed values of the transactions (Merkle root) are then sent off to the miners, who choose the list and mine the blocks.
2) The winning miner sends the skeleton of a mined block off to several new full nodes. The skeleton includes the coinbase transaction, which contains:
    a. The mining reward.
    b. A secret which is part of a commitment scheme which is used as a payment mechanism for providing the validated list.
    c. Payment for block validation and/or storage of the block on the blockchain.

The [transaction] validating node will be reimbursed for validation of the transaction by means of a fee-based system. The receiving validating/new full nodes will be rewarded for one or more of;
1) Providing the miners with lists of validated transaction (Tx) hashes (see b. above).
2) Reassembling blocks from block skeletons ("flat" fee).
3) Size of the block ("per-MB-storage" payment).

The incentive lies in the 100 block confirmation time, $T_{100}$.
1) Miners need to wait for $t\sim T_{100}$, in order to claim their rewards.
2) Validation nodes need to wait for $t\sim T_{100}$, before they receive their fee for validating the Txs in the block.
3) New full nodes need to wait $t\sim T_{100}$, before they receive the block assembly fee and the size-dependent storage payment.

Thus, the 100 block confirmation time will provide the necessary incentive for miners to propagate skeleton blocks (including payment) to a range of new full nodes, and new full nodes will be incentivised to propagate the skeleton blocks to other new full.

Also it should be pointed out that the miners are free to choose the lists (of transactions) they wish to be included in a block. We thus envisage a marketplace, consisting of validating nodes competing by compiling lists of validated transactions that miners can choose from and buy by means of commitment transactions.

Mining Revisited

The Bitcoin ecosystem relies on the process of mining. Miners gather transactions (Txs) from the mempool (or as envisaged here, from specialized validation nodes), organize them into blocks and attempt to find a solution (nonce) that solves the hash puzzle. The block header contains the hash of the previous block on the blockchain, the root of the Merkle tree of the transactions and the nonce included by the miner. Solving the puzzle consists of calculating the double SHA256 hash of a nonce (iteratively chosen) concatenated with the previous block hash and Merkle root, and checking if it is less than the so-called difficulty target. If it falls below, the puzzle has been solved, if above the iteration over nonces continues. This remains unchanged in the new paradigm. What poses a challenge is the vastly enlarged block size and the distribution of mined blocks across the network. With Gb-sized blocks, it will not necessarily be feasible to broadcast whole blocks over the network.

Instead, we propose a solution that follows the steps:
1. The miners receive a list of validated transactions from the validation/M-nodes and/or new full nodes.
2. Miners themselves may or may not operate their own mempool of Tx hash values, which follows a certain ordering convention. An example of such ordering is given in [https://www.cryptocoinsnews.com/bitcoin-in-bloom-how-iblts-allow-bitcoin-scale/].
3. Miners solve hash puzzles by determining a nonce, n.
4. Next, a hash tree (Merkle tree, here referred to as HT) is calculated and the root of the tree stored (see next section).
5. This list of Txs is used to create an IBLT. The IBLT can be used to calculate the difference in content between two sets (e.g. mempool), and to reconcile the two sets.
6. The tuple (n;IBLT;CoinBase Tx;HT root) is broadcast to the validation/M-nodes.
7. The new full nodes operate DHTs for mempools and storage for the blockchain.
8. The pools re-assemble the blocks based on the tuples (n;BILTCoinBase Tx;IT root) and record the block on the blockchain, either by a) storing the block themselves or b) by storing on a specialized storage node.

Avoiding a Race Between Miners

The miners will be able to choose list of validated transactions from a marketplace consisting of several validating nodes. Unless stated otherwise, it is fair to assume that the miners will be choosing the lists that maximize their potential revenue. The attentive reader may point out that this could lead to miners choosing the same list from the same node, predominantly. This, in turn, would lead to a situation where several miners would race against each other, trying to mine the same block. This would favour the miner(s) with the largest amount of hashing power.

We propose to add an extra field to the block header. This field contains a random number chosen by each miner. This guarantees that each miner starts with a different starting point, and will thus prevent that solving block solely comes down to hashing power. This, in turn, will mimic the situation now where miners tend to mine similar, but individually chosen and slightly differing blocks.

Protocols

Here we describe the protocol necessary to operate the new full nodes.

In order for the proposed system to function the mempools of the nodes involved (validators, miners, new full nodes . . . ) should follow an ordering convention for the transactions. Here we propose to use the canonical ordering that, in turn, was proposed by Gavin Andresen. There, the ordering pertained to the list of transactions in the block, but here we put forward the idea that all validating and new full nodes use the same convention for their mempools.

The convention can be summarized as follows:
1) Sort the transactions in ascending order with respect to the previous transaction hash.
2) From the sorted list add first transactions that do not depend on later transactions.

As seen previously, blocks contain a so-called Merkle root hash. It is a produced by hashing all the transactions, including the coinbase transaction and subsequently hashing concatenations of the hashes until the Merkle root hash is reached. It becomes apparent that if it were not for the fact that the miner is producing the coinbase transaction, the validation nodes could calculate the entire Merkle tree and, hence, the Merkle root and corresponding hash.

Here we propose the Merkle tree to be calculated by means of a procedure in the following way:

The validator node calculates a Little Merkle Root. The procedure is the same as when calculating a standard Merkle root, with several exceptions:
1) The coinbase transaction is left out.
2) A so-called commitment transaction is included.
3) The miner produces the coinbase transaction, concatenates it with the Little Merkle root hash which yields the Merkle root hash.

Figure 8:
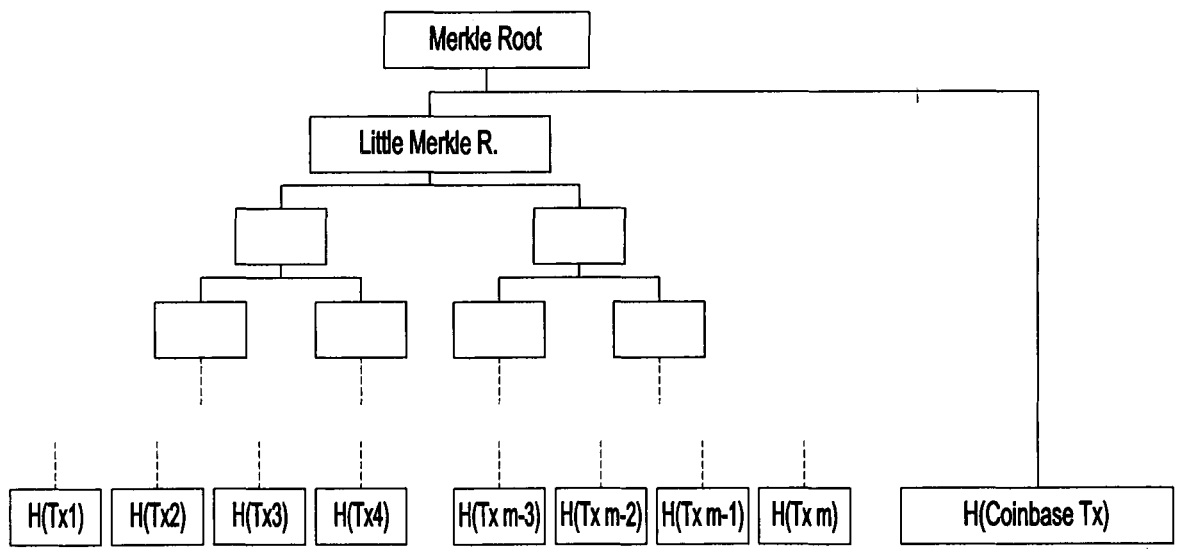
FIG. 8 illustrates a new Merkle Tree structure that constitutes a modification to the current protocol.

This is shown in FIG. 8 which illustrates a new Merkle Tree structure. Note that this constitutes a modification to the current protocol.

Modification to the Block Header

As mentioned, we propose to add an extra field, containing a random number chosen by the miner, to the block header. Thus, solving the hash puzzle changes in the following way:

SHA256[SHA256[Prev.Block Hash||Merkle Root||nonce]]
↓
SHA256[SHA256[RND||Prev.Block Hash||Merkle Root||nonce]]

We thus propose that the block header of the mined new blocks are enhanced with an extra field, containing the random number. The block header will contain the following:
1. Version number (4 bytes)
2. Hash of previous block header (32 bytes)
3. Merkle root hash (32 bytes)
4. Time (4 bytes)
5. Target threshold (encoded as nBits—4 bytes)
6. Nonce (4 bytes)
7. Random number (4 bytes)

Validation→Miner

Validation Node

Upon request, the validating node (which may or may not be a new full node) prepares a list of validated transactions to be mined.

The validator node creates a commitment transaction.

The so-called Little Merkle Root (see preceding subsection) is calculated, with the commitment transaction included.

The validator node prepares two IBLTs:
1) for all the transactions in the block (IBLT1); and
2) for all the corresponding TxIDs in the block (IBLT2)

The validator node sends off to the miner:
1) Little Merkle Root.
2) IBLT1.
3) IBLT2 (Optional—only if miner operates with own TxID-/mempool).
4) The previous block hash.
5) A hash checksum of the above.

Miner

Upon reception of the data from the validator node, the miner proceeds with creating a coinbase transaction, which includes the reward for mining, as well as rewards for the block validation/storage of the new full nodes the miner wishes to send the mined block to. Furthermore, the coinbase transaction contains an output field with a secret, matching the secret in the commitment transaction.

The miner uses the Little Merkle Root, received from the validator node, and combines it with the coinbase transaction in order to create the Merkle Root hash.

The miner now has the all the information necessary to begin solving the hash puzzle.

Mining proceeds along the lines described earlier.

Miner→New Full Node

Miner

When a block has been mined the miner sends the following to a list of new full nodes:
The nonce (solution to the puzzle), n.
Coinbase transaction.
Block header.
Merkle Root.
Little Merkle Root.
IBLT1.
IBLT2 (Optional).
The hash checksum.

New Full Node

Checks if the appropriate reward is in the coinbase transaction.
The node checks that the received data are consistent, by calculating the checksum (hash).
The node uses IBLT1 to make sure that the transactions in the block are present in the mempool.
Querying the mempool using IBLT1 the node assembles the block. The block is then stored (see section on new full nodes and storage).
The data received from the miner is broadcast to other new full nodes.

Customised Transaction Lists

We envisage a situation where the market of validated transactions will adapt to the need of the miners. Miners will tend to pick the list that maximises their potential and the validating M-nodes will be picking up on such trends.

There may be cases where miners may wish to customize their blocks by combining transactions from two or more lists. It is possible to carry out set reconciliation between two sets by calculating the difference between two IBLTs. The miner would then send back the IBLT containing the differences to one of the providing nodes and this way retrieve the information necessary to make a list, which contains all the transactions in both lists.

It appears that should miners want to compile their own lists based on several lists introduces additional challenges. Here, we briefly address the various points.

If miners were to combine lists from various validating nodes it is not clear how the Merkle root should be combined. Here we propose the following:
to construct a Big Little Merkle root of the individual Little Merkle roots; and combine the Big Little Merkle root with the coinbase transaction.

Additional expenses are not proportional to the amount of additional transactions added to list/block. Since it is fair to assume that the various mempools will be overlapping considerably, combining lists will amount to adding a few (relatively speaking) transaction from a different list. Yet, in order to combine the lists the miner will have to "buy" the full lists (by means of commitment transactions) from each validating node. It remains to be seen whether this would be a profitable approach for the miners.

Combining lists from several validating nodes requires a commitment between the miner and each of the providing validating nodes. It is possible to imagine an abuse of this system, by the miner. At present there is no rule/protocol enforcing that all the commitment transactions would end up in the block. One possibility is that the validating nodes can check each block and veto those blocks that contain their transactions.

Summary of Node Structure and Operation

Today's Bitcoin network is heavily centred around mining, in terms of computational effort. With vastly increased volumes of transactions this is not necessarily going to be feasible. The solution described in this specification leads to relegation of various tasks to accordingly specialised nodes, and where miners become even more specialised themselves. Compiling lists of validated transactions, re-constructing blocks based on block skeletons, and storing are all functions that will require significant resources. Hence, the structure of the Bitcoin network is anticipated to change and, together with it, the incentivisation. We have described those issues in detail in this specification.

Elements introduced in this specification include:
New types of node structure, here called new full nodes or super-nodes, which may or may not be extensions to validating M-nodes.
The nodes operate with protocols that effectively allow for the broadcast of Gb-sized blocks, both from validating nodes to miners, as well as from miners to new full nodes.
Two overall storage structures for storing the blockchain, which may or may not be part of the proposed new full nodes.
An incentivisation model that allows for the creation of a market of pre-block lists of validated transactions and for post-mining block assembling and storage.
A new Merkle tree structure that frees the miners of the requirement of maintaining their own mempool.
The addition of an extra field in the block header with a random number that is chosen by the miners in order to avoid the act of mining becomes a race purely based on hash power.
Validation is rewarded using special commitment transactions.

According to one implementation, a computer-implemented method for a node of a blockchain network is provided, the computer-implemented method comprising:

receiving mined data from the blockchain network corresponding to a plurality of validated transactions;
assembling blocks based on said mined data; and
sending assembled blocks to a storage entity for storing on a blockchain.

Such a method enables the nodes to construct large blocks to be stored on a storage entity without requiring miners to construct and store large blocks and transmit such blocks over the blockchain network. Further still, the architecture allows the use of large scale storage entities dedicated to storing a large and ever growing blockchain.

The computer-implemented method may further comprise:

receiving transactions from the blockchain network;
validating transactions received from the blockchain network;
maintaining a distributed, decentralized storage of validated transactions with other nodes in the blockchain network; and
distributing data corresponding to said validated transactions to the blockchain network for mining, the data comprising lists of validated transactions.

Each list can provide a complete list of validated transactions for mining into a block.

Such a method effectively takes away the requirement for miners to perform the validation function while retaining a distributed, decentralized storage of the validated transactions with other nodes in the blockchain network. Furthermore, the method enables transaction validation nodes to provide a service to miners by preparing and distributing data corresponding to validated transactions to the blockchain network for mining. For example, the method enables lists of validated transactions to be prepared and distributed.

The step of maintaining the distributed, decentralized storage of validated transactions with other transaction validation nodes in the blockchain network may comprise synchronizing transaction validation nodes on the blockchain network to maintain an up-to-date list of validated transactions in a decentralized and distributed manner. For example, the validation nodes can be synchronized by exchanging invertible bloom filter lookup tables. The validated transactions can also be sorted into a defined order such that a common ordering system is used across transaction validation nodes in the blockchain network for maintaining the distributed, decentralized storage of validated transactions. For example, a canonical ordering system can be used for maintaining the distributed, decentralized storage of validated transactions. It has been found that this is a particularly efficient way of retaining a decentralized and distributed storage while ensuring that transaction data across the network is maintained in a consistent manner.

The step of distributing data corresponding to the validated transactions to the blockchain network for mining can include preparing data corresponding to a list of validated transactions (such as an invertible bloom look up table and any accompanying data corresponding to a list of validated transactions, wherein the validated transactions are contained in blocks). Furthermore, the step of distributing data corresponding to the validated transactions to the blockchain network for mining can include creating a commitment transaction for a digital asset in exchange for providing the data corresponding to the list of validated transactions to a miner. For example, a hash (Merkle) tree, a Patricia tree, or another type of radix tree can be calculated with the commitment transaction included.

After the data corresponding to the validation transactions is distributed and mined by solving an associated cryptographic puzzle, e.g. a hash puzzle, the mined data is sent back to a transaction validation node rather than stored directly on the blockchain by the miners. This mined data can then be assembled into (large) blocks and stored either on a storage entity configured specifically for storage of large quantities of data and/or over a distributed storage system. As previously stated, this enables the validation nodes to construct large blocks to be stored on a storage entity without requiring miners to construct and store large blocks and transmit such blocks over the blockchain network. Further still, the architecture allows the use of large scale storage entities dedicated to storing a large an ever growing blockchain.

The mined data received from the blockchain network can include a block header corresponding to the validated transactions. The mined data can also include a transaction for a digital asset in exchange for assembling and or storing blocks based on the mined data. Furthermore, the method can include a requirement to waiting for a time period t associated with a minimum number of blocks prior to receiving the digital asset. This provides an incentive scheme for providing a validation node as the providers will be rewarded for providing lists of validated transactions (for example in the form of invertible bloom look up tables) for mining and/or for storing mined blocks on the blockchain. Requiring a minimum time period prior to receiving a digital asset incentivises miners to propagate skeleton blocks (including payment) to a range of nodes, and nodes will be incentivised to propagate skeleton blocks to other nodes.

The step of assembling blocks based on mined data can involve assembling large blocks with each block having a size of, for example, at least 2, 4, 6, 8, 10, 50, 100, 500, 1000, or 10000 megabytes. Although the upper limit will increase over time, a nominal upper value of 1 petabyte may be specified. Each block may comprise, for example, at least 5000, 10000, 500000, 100000, 500000 or 1000000 transactions. Although the upper limit will increase over time, a nominal upper value of $10^{12}$ transactions per block may be specified. As previously indicated, the method, node, and blockchain network architecture as described herein enables large blocks to be constructed and stored on a storage entity without requiring miners to construct and store large numbers of transactions. This enables the system to handle a vastly increased transaction rate.

In the methodology as described herein, the blocks may be modified to include a block header containing a random number provided by a miner. That is, the transaction validation nodes can be configured to process blocks which include a block header containing a random number provided by a miner when receiving solved transactions from the blockchain network. This constitutes a change to the block header whereby miners can choose or randomly generate a number which is inserted into the block header. This aids in ensuring that miners do not compete in trying to mine identical blocks even when the same list of transactions is selected by numerous miners.

The storage entity for storing the aforementioned large blocks of data can be shared between a plurality of transaction validation nodes on the blockchain network, the plurality of transaction validation nodes forming a super node on the blockchain network, wherein the shared storage entity is either a common storage node, a distributed storage, or a combination of the two. This architecture leads to the formation of a super-node on the blockchain network and allows the provisions of dedicated storage facilities for storing the blockchain and servicing the blockchain network.

In light of the above, there is also provided a super-node of a blockchain network, the super node comprising:
- a plurality of validation nodes as previously described; and
- a shared storage entity for storing the blockchain, wherein the shared storage entity is either a common storage node, a distributed storage, or a combination of the two, and
- wherein blocks assembled by the plurality of validation nodes are sent to, and stored on, the shared storage entity whereby the shared storage entity maintains the blockchain.

This architecture is better suited to handling the large block sizes required to achieve the desired increase in transaction rates which is an aim of the method and configurations described herein. For example, the shared storage entity may be configured to have a storage capacity of at least 100 gigabytes, and more preferably at least 1, 10, 100, or 1000 terabytes of storage capacity. Although the upper limit will increase over time, a nominal upper value of $10^6$ terabytes or even $10^6$ vottabytes may be specified.

In terms of the overall network architecture, a blockchain network can be provided which comprises a plurality of such super-nodes. The super-nodes can be connected (but do not overlap) on the blockchain network and the shared storage entity of each super-node is configured to store a copy of the blockchain. The super-nodes effectively comprise a group of nodes which form a pool which functions as a super-node. In order to maintain the distributed nature of the blockchain, there should advantageously be a certain number of such super-nodes (e.g. at least 10, 50, 100, or 1000 and optionally less than 100,000,000).

Bloom Filters and IBLTs

In this section we summarize the properties of the so-called Bloom filters and an extension to those, called Invertible Bloom Lookup Tables.

Figure 9:
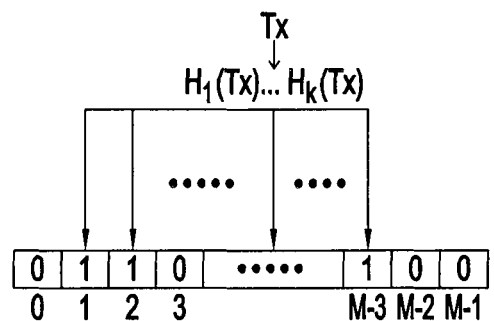
FIG. 9 shows the workflow in creating a Bloom filter.

In its simplest form a Bloom filter is an array. The array has two parameters associated with it, M and k. M is the number of bits in the array and k is the number of different hash functions, $H_k$, such that $$H_i: S_{16} \rightarrow \{0:M-1\}, \forall 1 \leq i \leq k$$

where $S_{16}$ is the space of hexadecimal strings, on which the hash functions are acting. In order to determine if a transaction, $Tx_0$, belongs to the set the Bloom filter has been made for, we need to calculate $H_1(Tx_0) \ldots H_k(Tx_0)$ and subsequently check if the corresponding bits are set to 1 in the array. FIG. 9 shows the workflow in creating a Bloom filter.

If one or more are not, then $Tx_0$ is definitely not in the set queried. Bloom filters do, however, allow for false positives. This comes from the fact that the probability of a hash function to change a bit to 1 is p=1/[size of array]=1/M. Thus, a bit is not set to 1 by a give hash function with the so-called $$1 - p = 1 - \frac{1}{M}$$

Hence, if there are k hash functions the probability of a given bit not being set to 1 is $$\overline{P} = (1-p)^k = \left(1 - \frac{1}{M}\right)^k$$

If n elements need to be inserted this becomes $$\overline{P}_n = (1-p)^{kn} = \left(1 - \frac{1}{M}\right)^{kn}$$

One apparent shortcoming of the Bloom filter is that it does not keep track nor maintain any particular ordering. It quickly becomes clear that if we wish to maintain an indexing of items that are to be filtered we need to extend the capabilities of the filter. This is where Invertible Bloom Filters (IBFs) and Invertible Bloom Lookup Tables (IBLTs) come in.

Figure 10:
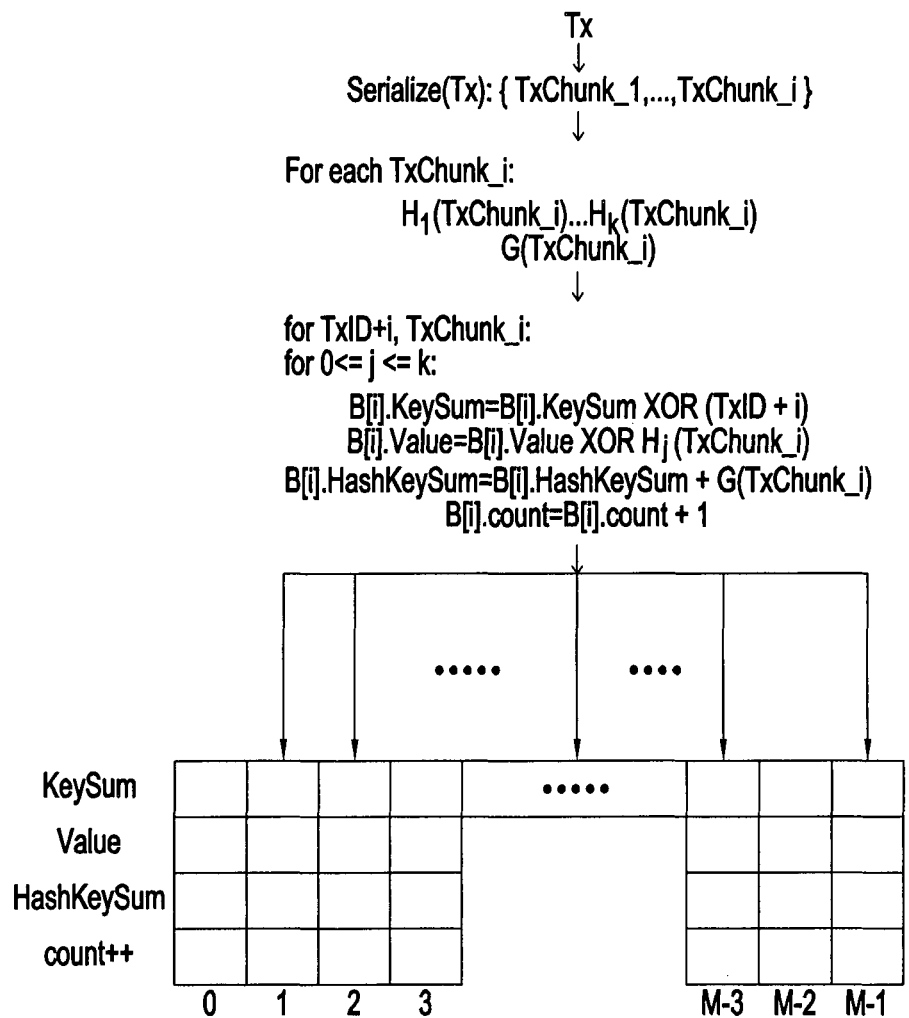
FIG. 10 shows the workflow illustrating how transactions are encoded in Invertible Bloom Filters (IBFs) and Invertible Bloom Lookup Tables (IBLTs)

Instead of only activating bits in an array, the XOR sum of keys, Hashed values (like before) and an overall counter are stored in each field of the IBF. The procedure is illustrated in FIG. 10 which shows the workflow illustrating how transactions are encoded in an IBF/IBLT.

Applications

Let us assume that we have two nodes, $N_1$ and $N_2$, maintaining mempools $m_1$ and $m_2$, respectively. Each mempool contains elements from a universe of hexstrings, $S_{16}$. Let us further assume that the mempools follow an ordering convention as proposed by Andresen and outlined previously in this specification.

Now, $N_1$ sends $m_1$ to $N_2$. $N_2$ can now approach set reconciliation in two ways:
1) Calculate the set difference by $\Delta m = m_2 - m_1$ (see (David Eppstein, 2011). (Michael T. Goodrich, 2011))
2) Iterate over transactions in $m_2$ and check is they are present in mempool of $N_1$ We see that IBLT can be used for at least two purposes:
1) To have nodes assemble mined blocks based on the transactions they already have in their mempool, and help identify and retrieve those they don't have.
2) Maintain a certain level of synchronization among mempools belonging to different nodes.

Pruning on Distributed Mempools

As described above, the future of blockchain technology, e.g. Bitcoin, relies at least in part on proposals for new architectures able to increase the volume of issued transactions per second. One requirement for such new architectures is the removal of the current limitations on the block size limit. In this scenario, local memory pools are not be able to provide sufficient storage capabilities, therefore new models for distributed memory pools (DMPs) need to be designed. A modified architecture for the management of distributed memory pools provides the following features:
- global consensus for the validity of transactions stored in the distributed memory pool;
- consistency and integrity of the stored information:
- fast reading and writing operations; and
- security mechanisms against routing and storage attacks in the distributed memory pool.

Once a transaction is included in a newly mined block, the corresponding copy in the DMP may not be required to be stored anymore. In this section we extend the previous architecture by providing a protocol for the safe removal of transactions from the DMPs.

We present a summary of the DMP architecture and the Distributed Hash Table (DHT) operations provided. We also introduce a novel mechanism to reach a distributed consensus for the pruning of transactions within a DMP. Moreover, different policies to solve data inconsistencies within the DMP are presented including:

- a transaction may be marked as removed but still locally stored in a mempool node;
- the same transaction may be marked as removed in a mempool node and still available in another mempool node;
- blockchain reorganization may require the storage of transactions previously removed from a mempool.

Individual nodes in the current Bitcoin network can be seen as clusters of nodes providing a distributed memory pool (DMP). The proposed DMP relies on a Distributed Hast Table (DHT) structure deployed in a network composed of individual trust relations between honest nodes. A node's set of connections is built on the collection of both routing and application-level information. No central authority is involved in the release or storage of trust certifications: each node maintains records of its own trusted peers.

Malicious entities need to join the network to perform some forms of attack. For instance, Sybil attacks are focused on the creation of a high number of false identities in order to compromise the system [John R Douceur, The Sybil Attack, First International Workshop on Peer-to-Peer Systems, Springer-Verlag, London, UK, 2002]. A Sybil node connected to the network may interrupt or delay the legit routing queries, and disseminate wrong routing information. The DHT routing protocol described herein has sublinear time and space complexity and is based on the following assumptions:

- nodes are not able to discriminate honest and malicious nodes:
- the majority of honest nodes has more connections to other honest nodes; and
- each node is responsible for storing information about a partition of the key space.

The DHT protocol provides two main functions:

UPDATE( ) is used to build routing tables and insert keys at each DHT node; and

GET(x, k) is used by DHT node x to find the target key-value record represented by key k.

Each DHT node x is usually identified by a public key $P_x$ and the current IP address addrx. This information is securely linked with a record $sign_x(P_x, addr_x)$, where $sign_x( )$ represents the signature with the corresponding private key. The node ID is then stored in the DHT using the signed record. When a node changes location or receives a new IP address, a new record $[P_x, addr_x]$ must be stored into the DHT. A malicious node could insert wrrong key-value pairs. GET method is responsible to verify the signature in the returned key-value records.

The data routing network can be represented by an undirected graph. A malicious edge connects a malicious node to an honest node, while an honest edge connects two honest nodes. While creating an arbitrary number of Sybil identities may be computationally affordable for a malicious entity, creating a malicious edge requires convincing an honest node to establish a trusted link to one of the Sybil-controlled identities. If there is no sparse cut dividing the honest region in two, a short random walk starting at an honest node is likely to end at an honest node.

A node's routing table can be built by initiating independent random walks in the network. The node will collect one or more random key-value records from the recipient node of each walk. This routing information is used during the lookup: if the local table does not contain the key, a lookup message is multicast to a set of nodes. One or more receiving nodes are likely to have the queried key-value record locally stored. No direct requests for other nodes' tables are sent. Therefore, a malicious node is not able to arbitrarily increase the number of wrong entries in a remote table.

The keys are not stored in the shared space using deterministic functions, e.g. hash, to prevent malicious nodes to brute-force a desired output and insert wrong keys between two honest keys. Therefore, no function to measure the distance between two keys will be defined. Each node x builds a long-distance routing table containing pointers to other nodes with IDs uniformly distributed over the key space. Pointers are stored by initiating random walks and collecting random IDs from the ending node. The short-distance routing table contains key-value records. These keys are the closest following a node's ID according to a predefined ordering.

The routing structure is able to manage: (a) node failure, i.e. the redundancy in the routing tables provides alternative paths to retrieve a key value; (b) key changes, i.e. adding or removing keys leads to misalignments between the distribution of keys and the distribution of long-distance pointers in the DHT space; and (c) changes in the network connections, i.e. adding or removing trusted connections do not affect the routing performance as long as no sparse cut partitions the honest network and no endpoint becomes malicious. Synchronization and availability of new keys are provided by means of periodic UPDATE calls.

The concept of trusted connections is fundamental to provide security and integrity in the DHT infrastructure. Two different mechanisms can be involved to create new edges in the network.

Subjective connections are built on social or professional relationship between peers: e.g. friendship, contracts and trust on global or local well-known entities. For instance, non-profit organizations, research institutes, government entities as well as private companies who signed particular agreements can be trusted connections.

Transitive connections are based on logic properties and degree of trust to increase the number of random paths over the network. An increasing randomness in the hop-by-hop walks makes for a malicious node harder to exploit the vulnerabilities of a malicious edge. Signed messages can be exchanged between peers to be aware of the trusted connections between other nodes. A node may decide to assign different weights to its trusted connections in order to adjust the probabilities of choosing individual hops in the random walks or to initialize new transitive connections. Every node is responsible for their own weights. Honest nodes will adjust their connections' weights according to the routing behaviour of their peers: a node may fail to provide a valid key-value record in case the key is supposed to fall in its short-distance routing table. Therefore, new random walks are prevented to pass through weak edges, and the influence of malicious nodes will decrease over time.

Figure 11:
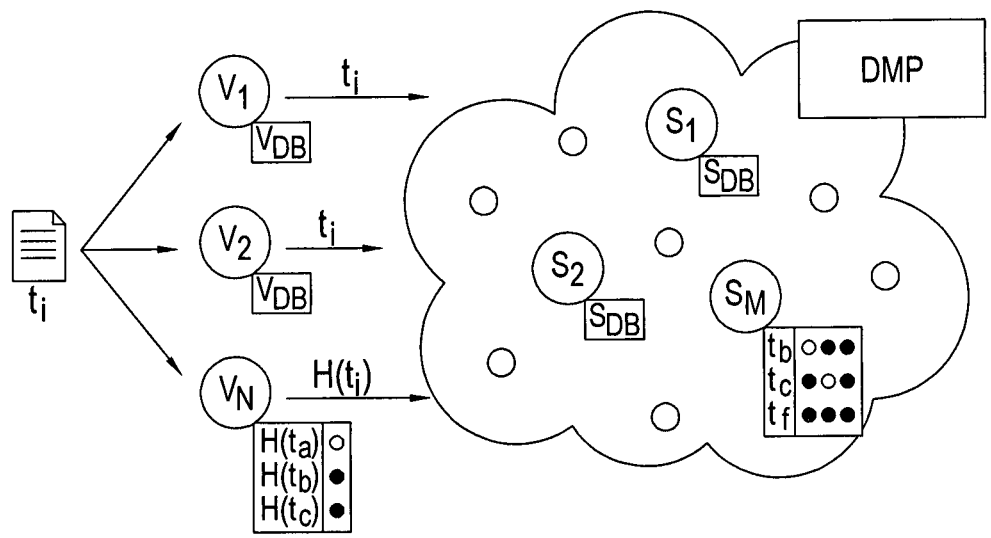
FIG. 11 illustrates a mempool cluster including validator nodes v and mempool nodes s.

DMP functionalities are provided by clusters of specialized Bitcoin nodes. Within a cluster, validator nodes collect and validate new incoming transactions, while mempool nodes are responsible for persistently memorizing validated transactions. FIG. 11 shows the design of a mempool cluster with validator nodes v and mempool nodes s. The functionalities of these two types of node may be provided by the same physical entity or embedded in different entities.

The DMP provides two fundamental operations: storage and retrieval of validated transactions. Given a transaction $t_i$, an identifier $id(t_i)$ can be assigned as $id_i = H(t_i)$, where H represents a hash function. The identifier will be used as key in the DMP. Using a specific multicast address, the transaction can be received from multiple validators within the cluster. Each validator will then verify the transaction independently. However, the underlying DHT structure does not embed a transaction ID in the key space to prevent key clustering attacks. Therefore, transactions can be stored in random nodes within the DMP. For a given transaction or group of transactions, validator nodes can send R STORE message requests to random mempool nodes, where R is the data replication factor.

Let's assume that N validators will independently verify a transaction $t_i$. Each validator v maintains a local database called $V_{DB}$. Each entry of the database contains the identifier of a transaction Id and the binary decision for the validation. Each validator will send a $STORE(t_i, id_i)$ or $REJECT(id_i)$ message to the DMP according to the local decision Each mempool node s will store t; only if $N/2+_1$ STORE messages are received. Alternatively, as soon as a node receives the first STORE message, it activates a timer for the reception of N/2 more STORE messages required to reach the quorum. If the timeout is exceeded and not enough confirmations are received, the transaction is discarded. Each mempool node $s_m$ will also keep the number of received confirmations $N_{i,m} > N/2+1$ for $t_i$.

Retrieval of a validated transaction t, requires the broadcast of a message $QUERY(id_i)$. The mempool nodes responsible for the storage of $t_i$ will send a message $DATA(t_i)$ to the query node. If M mempool nodes are required to store $t_i$, at least $M/2+1$ DATA messages should be received by the query node to consider the stored transaction consistent. Moreover, the query node may interrogate $N/2+1$ random validators with a $VALIDITY\_REQ(t_i)$ message to assess the validity of $t_i$ according to the information stored in $V_{DB}$.

A scalable architecture for the management of an increasing transactions activity requires storage infrastructures operating with large volume of data. For instance, a transaction rate of 10K txn/s and a transaction average size of 1 KB require a storage of ~27 TB of blocks per month.

Within an M-Net cluster, two different storage architectures (or a combination of those) are proposed. The first architecture is suitable for a larger entity that owns and maintains several validation nodes, which all have access to the centralized storage facility. In contrast, a fully decentralized architecture is suitable for individual nodes, with sufficient storage capacity, which wish to join a shared and distributed storage pool.

Hereinafter, we use the following terminology to represent transaction dependencies:
 a transaction can spend the outputs of the previous transaction called parent;
 a transaction can create outputs for a subsequent transaction called child.

Transaction dependencies, or chain of transactions, may be created to represent a complex transactional workflow that requires the children to be added before the parent [Bitcoin Core source code. URL: https://github.com/bitcoin/bitcoin]. When a chain of transactions is transmitted across the network, the data arrival order may not match the data transmission order. In that case, an orphan transaction pool is used by the receiving nodes to store transactions referencing a parent transaction that is not yet known. Once the parent is known, any orphans that reference the UTXO created by the parent are released from the orphan pool and revalidated recursively. The entire chain of transactions is then reconstructed in the correct order and included in the transaction pool. Therefore, when a new transaction is added to the mempool, it has no in-mempool children, because such children would be orphans.

There is a limit to the number of orphan transactions stored in memory to prevent a denial-of-service attack. If the number of orphan transactions in the pool exceeds the maximum allowed, randomly selected orphan transactions are evicted from the pool, until the pool size is back within the limits.

Local memory pool contains a set of transactions consistent with the node's perspective of the blockchain. A transaction can be removed from a local mempool because of one of the following reasons:
 Transaction publication in a mined block. When a new block is validated, its transactions are removed from the mempool.
 Blockchain reorganization (reorg). If a block is disconnected from the blockchain, its transactions are moved back to the mempool.
 Conflict with in-block transactions (double spending). When a new block is validated, all transactions that conflict with transactions in that block, plus all their dependencies, are removed from the mempool.

Moreover, depending on the configuration of the local mempool, the following additional cases can be considered:
 manual pruning;
 expiration; and
 local memory size limits.

When removing a transaction and its children, the complete set of transactions must be calculated before performing the actual removal, otherwise the mempool may fall in an inconsistent state where it is impossible to retrieve the parent. All ancestors of a given transaction marked to be removed need to be updated. Therefore, intermediate transactions in a chain cannot be removed until all relevant transaction's states are updated.

In the event of a reorg, a new transaction may have in-mempool children, causing an inconsistent state, because there may be descendant transactions of a transaction coming from a disconnected block. In this case, out-of-block descendants of in-block transactions in the mempool must be checked. In Bitcoin Core, function UpdateForDescendants_is used to update the descendants for an individual transaction added to the mempool and may have child transactions in the mempool [Bitcoin Core source code. URL: https://github.com/bitcoin/bitcoin].

As previously described, the winning miner sends a block skeleton back to the validation nodes. A block skeleton consists of a nonce, an Invertible Bloom filter Lookup Table (IBLT) and a coinbase transaction. Based on this, the validator nodes can:
 1. order the transactions in accordance with a specific set of rules:
 2. assemble the newly mined block;
 3. proceed with storing the block on their own storage;
 4. propagating the skeleton to other new full nodes.

Therefore, validating nodes are aware of newly published transactions. Each validator node can independently send delete messages containing a list of transactions IDs to the DMP. A validator may send delete requests only for transactions previously validated (check_validator_send enabled). This information is stored within database $V_{DB}$ (Validator database). According to this model, mempool nodes may discard delete requests received from validators who didn't validate the transactions (check_validator_rcv enabled). This information is stored within database $S_{DB}$ (Storage database). The two check_validator_send and check_validator_rcv options may be hard-coded or independently configurable. The delete messages are signed with the private key of the validator. The message must contain a nonce or a timestamp to avoid the dissemination of fraudulent duplicates which may affect the consensus protocol.

Figure 12:
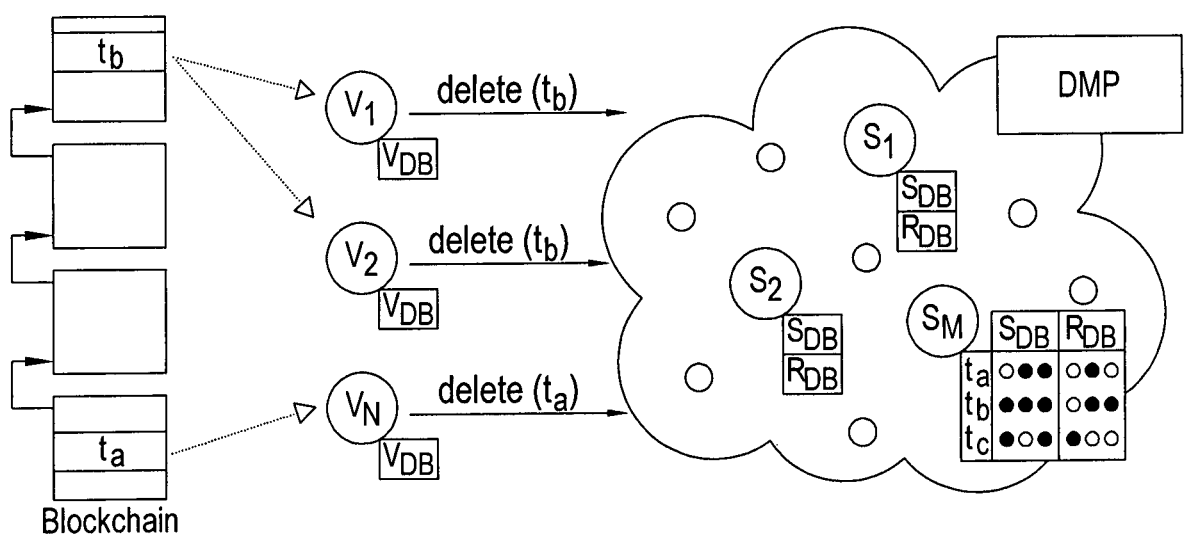
FIG. 12 shows validator nodes $v_n$ ($0 \leq n < N$) receiving updates about newly mined blocks—after validating a block, a validator sends a DELETE request for the published transactions to the distributed memory pool (DMP) and each mempool node $s_m$ ($0 \leq m < M$) keeps track of store requests on an SD table and removal requests on a $R_{DB}$ table.

FIG. 12 shows validator nodes $v_n$ (0≤n<N) which receive updates about newly mined blocks. After validating a block, a validator sends a DELETE request for the published transactions to the DMP. Each mempool node $s_m$ (0≤m<M) keeps track of the store requests on $S_{DB}$ table and the removal requests on $R_{DB}$ table. As shown in FIG. 12, a new table $R_{DB}$ (Removal database) is used by each mempool node to keep track of the delete requests for each stored transaction. Given a delete request for transaction $t_i$ from a validator n<N on a mempool node m<M, the local $R_{DB}$(m) table will contain Boolean $r_{mn}$ values. For instance, if N=100 and each mempool node is able to store 10 M transactions every 10 minutes for 3 days, the size of $R_{DB}$(m) can be bounded to: 100·10$^7$·3·24 6=432 GB. Please note that this figure represents a highly unlikely worst-case scenario where all transactions locally stored for the past 3 days have not been confirmed and 1 byte is required for each table entry. A table size at least one or two orders of magnitude smaller (e.g. ~4 GB) is likely to represent a more realistic scenario. However, because of the required high storage capabilities of the mempool nodes, we do not impose any constraint on the maximum size of the local tables.

Let $N^{max}$>N be the maximum number of validators who may send STORE or DELETE messages to a cluster. Depending on the chosen distributed architecture. $N^{MAX}$ may correspond to the total number of validators in the network or may be proportional to the size of a particular DMP cluster. The size of a DMP cluster is given by the number of mempool nodes and/or the total amount of transactions which may be locally stored.

We introduce some criteria to determine if a transaction $t_i$ stored in a local mempool node $s_m$ within a cluster should be removed:

At least $N^*$<$N^{MAX}$ validators send a DELETE request. A validator may actually contribute to $N^*$ depending on check_validator_send and check_validator_rcv settings. If one or both options are set, we may impose $N^*$≈N (approximation). If no options are set, we recommend $N^*$>N in order to achieve the highest possible consensus.

$t_i$ depends on a previously removed transaction $t_j$. If both transactions were stored in $s_m$ and $t_j$ was safely removed, then $t_i$ can be also safely removed (if the consensus for the removal of a transaction is reached, then a dependent transaction must be considered invalid and marked as removed). No signalling to other mempool nodes is required.

We don't force the DMP to store a chain of transactions in a single mempool node to prevent specific denial-of-service attacks. Therefore, mempool nodes may be in an inconsistent state because of the status of the individual transactions in the chain. This does not represent an issue as long as a Bitcoin node who requires the data related to a transaction chain learns about the inconsistency by means of specific query requests to the DMP. For instance, a Bitcoin node asks the DMP for a transaction $t_i$. This transaction depends on a second transaction $t_j$. After querying DMP about the second transaction, the node discovers that $t_j$ is not stored anymore. Therefore, it is the node's responsibility to consider $t_i$ unavailable even though still stored in some mempool nodes within the DMP. Long-term inconsistencies will be solved with permanent pruning.

If the consensus is reached, a transaction $t_i$ is locally marked as removed. However, for security reasons, the transaction may not be physically removed. We introduce two criteria to determine when the transaction should be physically removed from $s_m$:

At least $N^{**}$≥$N^*$ validators sent a DELETE request. Value of $N^{**}$ should be high enough to consider the pruning consensus completely safe.

An amount of time $\Delta T_i$>$\Delta T^*$ passed since the last DELETE request was received and no further data requests for $t_i$ were forwarded. Value of $\Delta T^*$ should be high enough to consider the probability of a reorg event negligible. According to the 6-block confirmation rule, a transaction can be safely considered accepted by the network roughly after 1 hour since its publication in a newly-mined block.

However, depending on the memory constraints of $s_m$, $t_i$ may be removed even though the above criteria are not met. The transactions may be sorted by descending $\Delta T_i$ and selected for permanent deletion. Transactions belonging to a chain and stored in $s_m$ must be removed at once. No notifications to validators for the pruning of a transaction chain is required. A Bitcoin node who requires the data related to a transaction chain learns about the inconsistency by means of specific query requests to the DMP.

Mempool nodes may collect data requests for transactions already marked as removed. Receiving multiple data requests for an individual transaction can have different meaning:

A denial-of-service attack to retain useless data

A blockchain reorg and the need to transfer back transactions to the DMP.

Since the requests may not be legitimate, mempool nodes do not take any action as a result of the data requests. A data request counter may be used to mark a removed transaction as a candidate for reversion. These candidates may be still considered for physical pruning. In case a priority policy for physical pruning is implemented, a lower priority may be assigned to the candidate transaction for reversion.

Transactions marked as removed but still locally stored can be only reverted if REVERT messages from the validators are received. Validators are responsible to signal the DMP if a chain reorg takes place. A mempool node needs to collect a certain number of unique REVERT messages to make a transaction available again. We recommend a number of messages as function of N, $N^*$ and/or $N^{**}$ parameters. For instance, the minimum number of REVERT messages may be equal to the mean value between N and $N^*$.

Table 3, as shown in FIG. 16, summarizes the configurable parameters used by the pruning protocol.

The protocol for managing transactions includes the following messages.

RECEIVED($t_i$). Validator's call-back triggered when a new unverified transaction $t_i$ is received.

STORE($t_i$, $id_i$). Validator's request to store a valid transaction $t_i$ and key A.

STORE($id_i$). Validator's optimized request to store a valid transaction key $id_i$.

QUERY($id_i$). Generic node's request for transaction with key $id_i$.

DATA($t_i$). Mempool node's reply to a query request of transaction $t_i$.

VALIDITY_REQ($t_i$). Generic node's request to double-check the validity of transaction $t_i$.

VALIDITY_ACK($t_i$). Validator's answer to a validity request for transaction $t_i$.

The extension presented here requires the following additional messages.

REMOVE($id_i$). Validator's request to remove the transaction identified by $id_i$.

REVERT($id_i$). Validator's request to revert the transaction identified by $id_i$ after a chain reorg.

REMOVED($id_i$). Mempool node's reply to a query request for removed transaction identified by $id_i$. If the information is still available, the message may contain the number of REMOVE messages received by the mempool node for the transaction identified by $id_i$.

Figure 13:
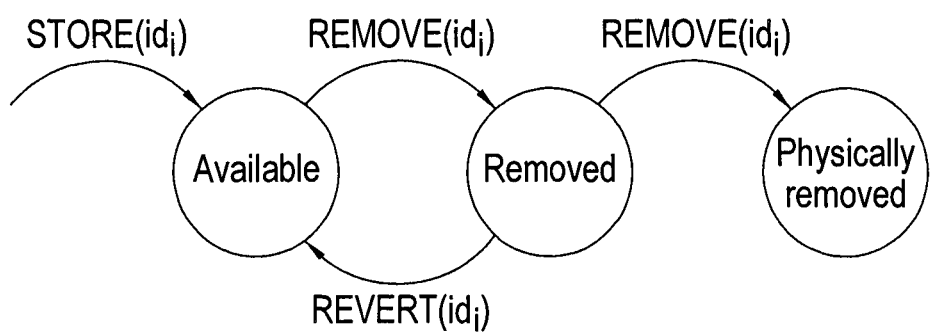
FIG. 13 shows a state diagram for a transaction $id_f$—depending on the type (i.e. STORE, REMOVE, REVERT) and number (e.g. N, N*, N**) of messages received from validators, a transaction can change state to Available, Removed or Physically removed.

The complete state diagram of a transaction identified by $id_i$ depending on the validators' requests is shown in FIG. 13. Depending on the type (i.e. STORE, REMOVE, REVERT) and number (e.g. N, N*, N**) of messages received from the validators, a transaction can change the state to Available, Removed or Physically removed. The transaction state "physically removed" cannot be reverted. However, depending on the features provided by the local file system and operating system, data may still be recovered.

It should be noted that the above-mentioned embodiments illustrate rather than limit the invention, and that those skilled in the art will be capable of designing many alternative embodiments without departing from the scope of the invention as defined by the appended claims. For example, it is to be understood that while transactions may transfer Bitcoins, users may instead exchange other resources using the methods and systems described herein, such as information, contracts, and tokens. A token represents an asset or resource according to a smart contract associated with the token, such that control of the token affords control of the asset or resource. The smart contract itself may be stored off-blockchain, or it may be stored inside one or more transactions.

In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

REFERENCES

An Integrated World. (n.d.). Retrieved from https://www.anintegratedworld.com/whats-in-a-block/

David Eppstein, M. T. (2011). What's the Difference? Efficient Set Reconciliation without Prior Context. *ACM*.

maidsafe. (n.d.). Retrieved from github.com: https://github.com/maidsafe/Whitepapers Michael T. Goodrich. M. M. (2011). Invertible Bloom Lookup Tables. *Communication. Control, and Computing (Allerton)*, 2011 49th Annual Allerton Conference on.

NebulousLabs. (n.d.). Retrieved from github.com: https://github.con/NebulousLabs/Sia O(1) *Block Propagation*. (n.d.). Retrieved from github.com: https://gist.github.com/gavinandresen/e20c3b5a1d4b97f79ac2

Wikipedia. (n.d.). Retrieved from https://en.wikipedia.org/wiki/Distributed_hash_table Wilkinson et al. (2016, December 15). Retrieved from https://storj.io/storj.pdf John R. Douceur. The Sybil Attack. First International Workshop on Peer-to-Peer Systems. Springer-Verlag, London, U K, 2002

Bitcoin Core source code. URL: https://github.com/bitcoin/bitcoin

The invention claimed is:

1. A computer-implemented method for a node of a blockchain network, the computer-implemented method comprising:
   storing, in a distributed hash table (DHT), a plurality of transactions, the plurality of transactions forming at least part of a distributed memory pool of unconfirmed transactions waiting to be mined into a block of a blockchain and confirmed mined transactions; and
   receiving a delete request from a validation node of the blockchain network, the delete request identifying one or more confirmed transactions in the distributed memory pool of transactions waiting to be mined which have been included in a newly mined block, the delete request indicating that one or more transactions should be deleted from the distributed memory pool, the method further comprising;
   verifying the delete request by authenticating that the validation node is authorized to validate transactions by verifying a digital signature of the validation node and confirming the validation node validated the one or more confirmed transactions identified in the delete request;
   marking a transaction as removed from the distributed memory pool when a first threshold number of delete requests is received for the transaction, the method further comprising;
   deleting the transaction data from the DHT of the distributed memory pool when a second threshold number of delete requests is received for the transaction, wherein the first and second threshold numbers of delete requests are required to come from a threshold number of different validation nodes in the blockchain network, wherein requiring the threshold numbers of delete requests from different validation nodes implements a consensus mechanism that maintains data consistency in the distributed memory pool.

2. The computer-implemented method according to claim 1, wherein the second threshold number is larger than the first threshold number.

3. The computer-implemented method according to claim 1, wherein a transaction is physically removed from the distributed memory pool only after a threshold time has passed since receiving a delete request, during which time no further data requests for the transaction are received.

4. The computer-implemented method according to claim 3, wherein the threshold time corresponds to one or more blocks being incorporated into the blockchain after the transaction was incorporated into the blockchain for which deletion from the distributed memory pool is requested.

5. The computer-implemented method according to claim 1, wherein transactions are physically removed from the distributed memory pool in descending order of time passed since receiving a delete request during which time no further data requests for the transaction are received.

6. The computer-implemented method according to claim 1, further comprising marking the transaction as removed from the distributed memory pool when the transaction depends on a previously removed transaction.

7. The computer-implemented method according to claim 1, wherein delete requests are stored in a database.

8. The computer-implemented method according to claim 1, wherein delete requests received from validators which didn't validate the transactions are discarded.

9. The computer-implemented method according to claim 8, wherein said transactions are discarded only if a check validator option is enabled.

10. The computer-implemented method according to claim 1, further comprising monitoring a number of data requests for transactions already marked as removed from the distributed memory pool.

11. The computer-implemented method according to claim 1, further comprising marking a transaction as a candidate for reversion back into the distributed memory pool after a threshold number of data requests is received for a transaction which is marked for removal from the distributed memory pool.

12. The computer-implemented method according to claim 1, further comprising unmarking a transaction as removed from the distributed memory pool when a revert request is received for the transaction.

13. The computer-implemented method according to claim 1, further comprising unmarking a transaction as removed from the distributed memory pool when a threshold number of revert requests is received for the transaction.

14. The computer-implemented method according to claim 13, wherein the threshold number of revert requests is required to come from a threshold number of different validation nodes in the blockchain network.

15. The computer-implemented method according to claim 1, further comprising sending a message indicating that a transaction has been removed from the distributed memory pool in response to a query for a transaction which has been removed from the distributed memory pool.

16. The computer-implemented method according to claim 15, wherein said message indicating that a transaction has been removed from the distributed memory pool also indicates a number of delete messages received for the removed transaction.

17. The computer-implemented method according to claim 1, wherein a transaction comprises three states with respect to the distributed memory pool:
 available;
 removed; and
 physically removed.

18. The computer-implemented method according to claim 1, wherein delete requests are activated by one or more of:
 reception of a mined block;
 blockchain reorganization; and
 double spending or other form of transaction conflict.

19. The computer-implemented method according to claim 1, wherein pruning of transactions from the distributed memory pool is activated by one or more of:
 manual pruning;
 transaction expiration; and
 a memory limit being reached for transaction in the distributed memory pool.

20. A node of a blockchain network, the node configured to perform the method of claim 1.

21. An electronic device comprising:
 an interface device;
 one or more processor(s) coupled to the interface device; and
 a memory coupled to the one or more processor(s), the memory having stored thereon computer executable instructions which, when executed, configure the one or more processor(s) to perform the method of claim 1.

22. An electronic device comprising:
 an interface device;
 one or more processor(s) coupled to the interface device; and
 a memory coupled to the one or more processor(s), the memory having stored thereon computer executable instructions which, when executed, configure the one or more processor(s) to:
 store, in a distributed hash table (DHT), a plurality of transactions, the plurality of transactions forming at least part of a distributed memory pool of unconfirmed transactions waiting to be mined into a block of a blockchain and confirmed mined transactions; and
 receive a delete request from a validation node of a blockchain network, the delete request identifying one or more confirmed transactions in the distributed memory pool of transactions waiting to be mined which have been included in a newly mined block, the delete request indicating that one or more transactions should be deleted from the distributed memory pool;
 verify the delete request by authenticating that the validation node is authorized to validate transactions by verifying a digital signature of the validation node and confirming the validation node validated the one or more confirmed transactions identified in the delete request;
 mark a transaction as removed from the distributed memory pool when a first threshold number of delete requests is received for the transaction; and
 delete transaction data from the DHT of the distributed memory pool when a second threshold number of delete requests is received for the transaction, wherein the first and second threshold numbers of delete requests are required to come from a threshold number of different validation nodes in the blockchain network, wherein requiring the threshold numbers of delete requests from different validation nodes implements a consensus mechanism that maintains data consistency in the distributed memory pool.

* * * * *